United States Patent
Noda et al.

(10) Patent No.: US 9,423,594 B2
(45) Date of Patent: Aug. 23, 2016

(54) IMAGING LENS AND IMAGING APPARATUS EQUIPPED WITH THE IMAGING LENS

(71) Applicant: FUJIFILM Corporation, Tokyo (JP)

(72) Inventors: Takayuki Noda, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/597,774

(22) Filed: Jan. 15, 2015

(65) Prior Publication Data

US 2015/0124332 A1    May 7, 2015

Related U.S. Application Data

(63) Continuation of application No. PCT/JP2013/003927, filed on Jun. 24, 2013.

(60) Provisional application No. 61/676,054, filed on Jul. 26, 2012.

(30) Foreign Application Priority Data

Jul. 18, 2012 (JP) .................. 2012-159250

(51) Int. Cl.
| | |
|---|---|
| G02B 13/18 | (2006.01) |
| G02B 3/02 | (2006.01) |
| G02B 9/62 | (2006.01) |
| G02B 13/00 | (2006.01) |
| H04N 5/225 | (2006.01) |

(52) U.S. Cl.
CPC ............ *G02B 13/0045* (2013.01); *G02B 9/62* (2013.01); *G02B 13/18* (2013.01); *H04N 5/2254* (2013.01)

(58) Field of Classification Search
CPC ...... G02B 9/62; G02B 13/18; G02B 13/0045; H04N 5/2254
USPC .......................... 359/756, 761, 713
See application file for complete search history.

(56) References Cited

U.S. PATENT DOCUMENTS

| 5,278,697 A | 1/1994 | Hyodo et al. |
| 6,844,987 B2 | 1/2005 | Endo et al. |
| 8,385,006 B2 | 2/2013 | Tsai et al. |

FOREIGN PATENT DOCUMENTS

| CN | 202067015 | 12/2011 |
| JP | 63-180927 | 7/1988 |
| JP | 02-181714 | 7/1990 |
| JP | 02-187716 | 7/1990 |
| JP | 04-250408 | 9/1992 |
| JP | 05-011187 | 1/1993 |
| JP | 07-84170 | 3/1995 |
| JP | 2002-365549 | 12/2002 |
| JP | 2004-102083 | 4/2004 |

OTHER PUBLICATIONS

International Search Report, PCT/JP2013/003927, Oct. 8, 2013.

*Primary Examiner* — Alicia M Harrington
(74) *Attorney, Agent, or Firm* — Young & Thompson

(57) ABSTRACT

An imaging lens is formed from six lenses, including a negative first lens having a concave surface toward the object side, a positive second lens, a negative third lens, a negative fourth lens of a meniscus shape with a concave surface toward the object side, a fifth lens, and a sixth lens having a concave surface toward the image side. The surface toward the image side thereof has an aspherical shape having at least one inflection point thereon, provided in this order from the object side.

19 Claims, 22 Drawing Sheets

EXAMPLE 1

EXAMPLE 2

EXAMPLE 4

EXAMPLE 6

EXAMPLE 9

FIG.15 EXAMPLE 4

FIG.20 EXAMPLE 9

IMAGING LENS AND IMAGING APPARATUS EQUIPPED WITH THE IMAGING LENS

CROSS REFERENCE TO RELATED APPLICATIONS

This application is a Continuation of PCT International Application No. PCT/JP2013/003927 filed on Jun. 24, 2013, which claims priority under 35 U.S.C. §119(a) to Japanese Patent Application No. 2012-159250 filed on Jul. 18, 2012 and U.S. Provisional Patent Application No. 61/676,054 filed on Jul. 26, 2012. Each of the above applications is hereby expressly incorporated by reference, in its entirety, into the present application.

BACKGROUND OF THE INVENTION

1. Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

2. Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a six lens configuration, which is a comparatively large number of lenses, may be considered. For example, Chinese Utility Model Publication No. 202067015 proposes an imaging lens with a six lens configuration, constituted by: a first lens having a positive refractive power, a second lens having a negative refractive power, a third lens having a positive refractive power, a fourth lens, a fifth lens, and a sixth lens, provided in this order from the object side. Japanese Unexamined Patent Publication No. 2004-102083 proposes an imaging lens with a six lens configuration including a first lens group which is positive as a whole, constituted by a first lens having a negative refractive power, a second lens having a positive refractive power, a third lens having a negative refractive power, and a fourth lens having a positive refractive power, and a second lens group having a negative refractive power, provided in this order form the object side. In addition, Japanese Unexamined Patent Publication Nos. 63(1988)-180927, 2(1990)-181714 and 2(1990)-187716 propose imaging lenses that realize high performance variable magnification lenses having six lens configurations, constituted by: a first lens having a negative refractive power, a second lens having a positive refractive power, a third lens having a negative refractive power, a fourth lens having a negative refractive power, a fifth lens, and a sixth lens, provided in this order from the object side.

In addition, wide angle imaging lenses are desired, particularly in imaging devices of cellular telephones, smart phones, and tablet terminals, in which there are often cases in which photographed images are enlarged by a digital zoom function then employed, in order to realize a wider photography range. Japanese Unexamined Patent Publication No. 4(1992)-250408 discloses an imaging lens with a five lens configuration, constituted by: a first lens having a negative refractive power, a second lens having a positive refractive power, a third lens having a negative refractive power, a fourth lens having a positive refractive power, and a fifth lens having a positive refractive power, provided in this order from the object side, in order to realize a wider angle of view.

DISCLOSURE OF THE INVENTION

Meanwhile, there is demand for imaging lenses for use in apparatuses which are becoming thinner such as smart phones and tablet terminals to have shorter total lengths. In order to meet all of the above demands, wider angles of view are desired in the imaging lenses disclosed in Chinese Utility Model Publication No. 202067015 and Japanese Unexamined Patent Publication Nos. 2004-102083, 63(1988)-180927, 2(1990)-181714 and 2(1990)-187716 and a shorter total length of the lens and a sufficiently large image size which is compatible with the sizes of imaging elements having high resolutions is desired in the imaging lens disclosed in Japanese Unexamined Patent Publication No. 4(1992)-250408.

The present invention has been developed in view of the foregoing points. The object of the present invention is to provide an imaging lens that can realize a widening of the angle of view and a shortening of the total length while being capable of realizing high imaging performance from a central angle of view to peripheral angles of view. It is another object of the present invention to provide an imaging apparatus equipped with the lens, which is capable of obtaining high resolution photographed images.

An imaging lens of the present invention consists essentially of six lenses, including:

a first lens having a negative refractive power and a concave surface toward the object side;

a second lens having a positive refractive power;

a third lens having a negative refractive power;

a fourth lens having a negative refractive power and is of a meniscus shape with a concave surface toward the object side;

a fifth lens; and a sixth lens having a concave surface toward the image side, the surface thereof toward the image side being of an aspherical shape having at least one inflection point thereon, provided in this order from the object side.

Note that in the imaging lens of the present invention, the expression "consists essentially of six lenses" means that the imaging lens of the present invention may also include lenses that practically have no power, optical elements other than lenses such as an aperture stop and a cover glass, and mechanical components such as lens flanges, a lens barrel, a camera shake correcting mechanism, etc., in addition to the six lenses. In addition, the shapes of the surfaces and the signs of the refractive powers of the above lenses will be considered in the paraxial region for those that include aspherical surfaces.

The optical performance of the imaging lens of the present invention can be further improved by adopting the following favorable configurations.

In the imaging lens of the present invention, it is preferable for the first lens to be of a meniscus shape with a concave surface toward the object side.

In the imaging lens of the present invention, it is preferable for an aperture stop to be positioned at the object side of the surface of the third lens toward the object side, and more preferable for the aperture stop to be positioned at the object side of the surface of the second lens toward the object side.

It is preferable for the imaging lens of the present invention to satisfy one of Conditional Formulae (1) through (11) below. Note that as a preferable aspect of the present invention, the imaging lens of the present invention may satisfy any one or arbitrary combinations of Conditional Formulae (1) through (11).

$$-1 < (R1f - R1r)/(R1f + R1r) < 0 \tag{1}$$

$$-0.5 < (R1f - R1r)/(R1f + R1r) < -0.05 \tag{1-1}$$

$$1 < f/f2 < 3 \tag{2}$$

$$1.3 < f/f2 < 2.5 \tag{2-1}$$

$$0 < f3/f1 < 0.5 \tag{3}$$

$$0 < f3/f1 < 0.3 \tag{3-1}$$

$$0 < f3/f4 < 1.2 \tag{4}$$

$$0 < f3/f4 < 0.8 \tag{4-1}$$

$$1 < f/R6r < 4 \tag{5}$$

$$-0.5 < (R4f - R4r)/(R4f + R4r) < 0 \tag{6}$$

$$40 < vd1 \tag{7}$$

$$1.0 < TTL/f < 3.0 \tag{8}$$

$$4.0 < TTL < 6.0 \tag{9}$$

$$0.28 < BFL/f < 0.42 \tag{10}$$

$$0.75 < BFL < 1.2 \tag{11}$$

wherein R1f is the paraxial radius of curvature of the surface of the first lens toward the object side, R1r is the paraxial radius of curvature of the surface of the first lens toward the image side, f is the focal distance of the entire system, f1 is the focal length of the first lens, f2 is the focal length of the second lens, f3 is the focal length of the third lens, f4 is the focal length of the fourth lens, R6r is the paraxial radius of curvature of the surface of the sixth lens toward the image side, R4f is the paraxial radius of curvature of the surface of the fourth lens toward the object side, R4r is the paraxial radius of curvature of the surface of the fourth lens toward the image side, vd1 is the Abbe's number of the first lens with respect to the d line, TTL is the distance from the surface of the first lens toward the object side to the imaging surface along the optical axis (the portion of the distance corresponding to the back focus is an air converted length) and BFL is the distance from the apex of the surface of the sixth lens toward the image side to the imaging surface (an air converted length).

Note that TTL refers to the length from the surface of the first lens toward the object side to the image formation plane along the optical axis when the object distance is infinity (total length of the lens). The portion corresponding to back focus within this length is an air converted length. For example, in the case that members that do not have refractive power, such as a filter and a cover glass, are inserted between the lens most toward the image side and the image formation plane, the thicknesses of these members are converted into air and calculated. In addition, BFL refers to an air converted length of the distance from the apex of the surface of the sixth lens toward the image side to the imaging surface (back focus) when the object distance is infinity.

An imaging apparatus of the present invention is equipped with the imaging lens of the present invention.

According to the imaging lens of the present invention, the configuration of each lens element is optimized within a lens configuration having six lenses as a whole, and the shape of the first lens is favorably configured in particular. Therefore, a lens system that can achieve a wide angle of view and a short total length while having high imaging performance from a central angle of view to peripheral angles of view can be realized.

The imaging apparatus of the present invention outputs image signals corresponding to optical images formed by the imaging lens of the present invention having high imaging performance. Therefore, the imaging apparatus of the present invention is capable of obtaining high resolution photographed images.

Figure 12:
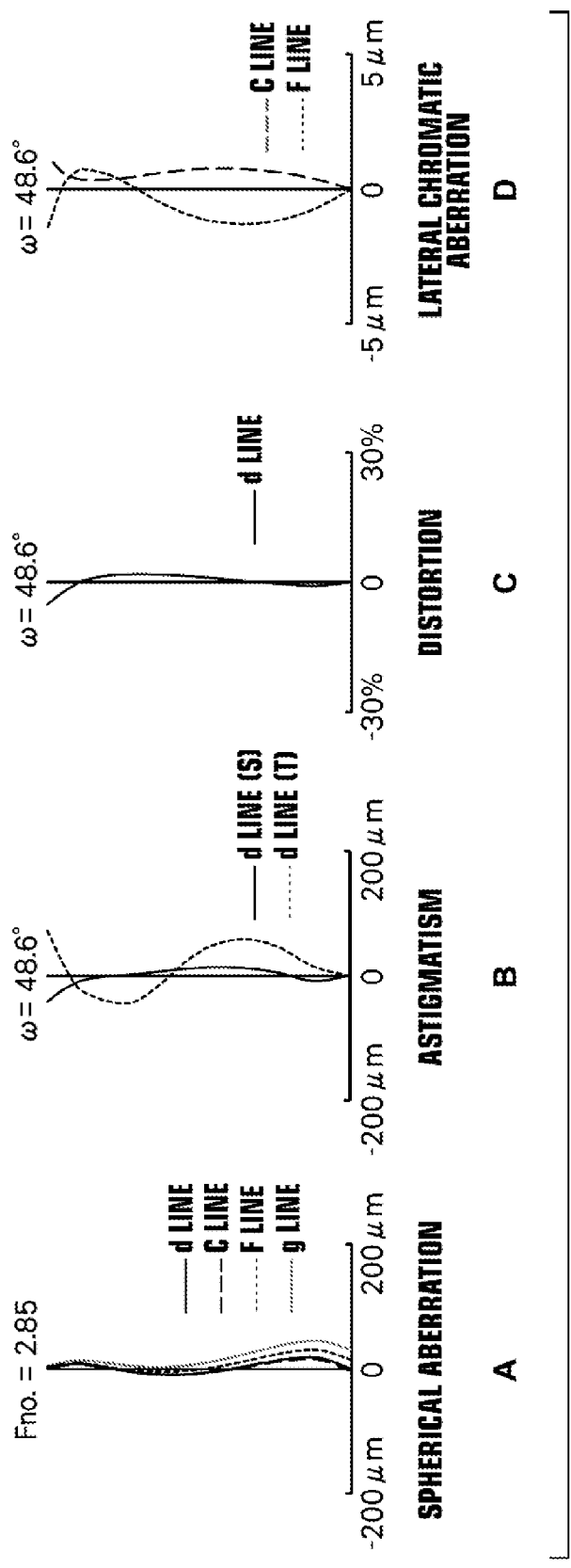

A through D of FIG. 12 are diagrams that illustrate aberrations of the imaging lens of Example 1, wherein A illustrates spherical aberration, B illustrates astigmatism (field curvature), C illustrates distortion, and D illustrates lateral chromatic aberration.

Figure 13:
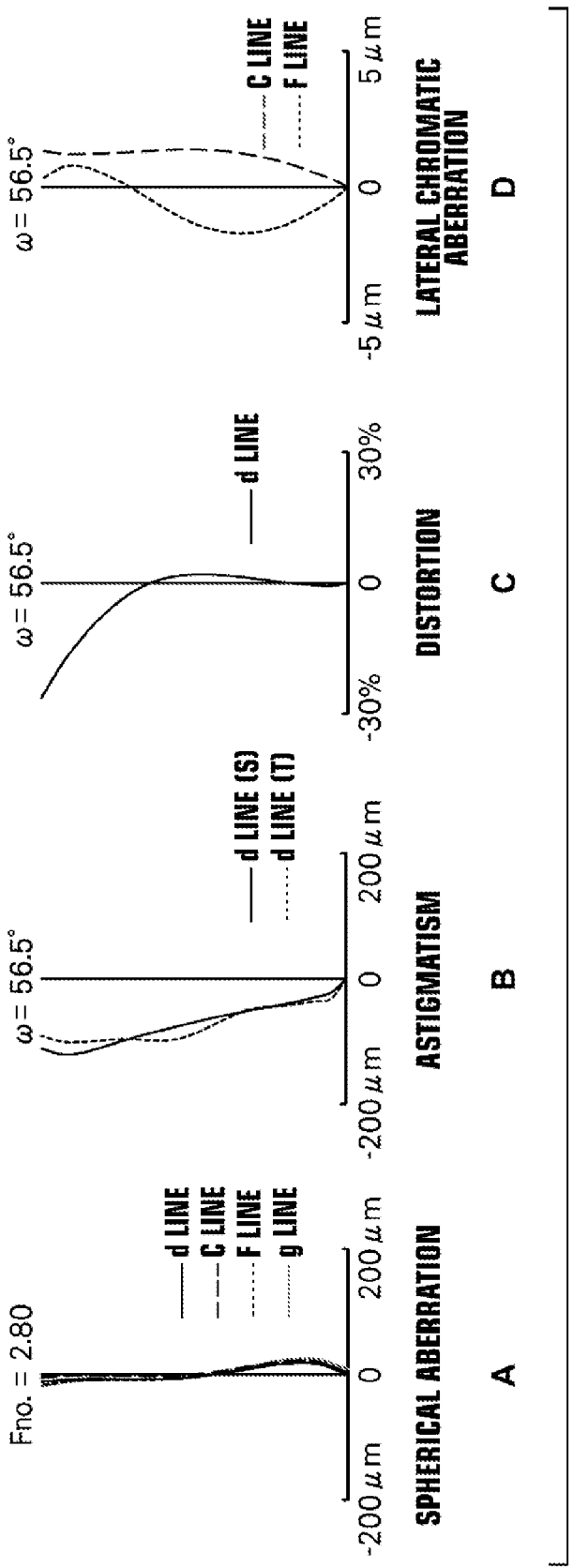

A through D of FIG. 13 are diagrams that illustrate aberrations of the imaging lens of Example 2, wherein A illustrates spherical aberration, B illustrates astigmatism (field curvature), C illustrates distortion, and D illustrates lateral chromatic aberration.

Figure 14:
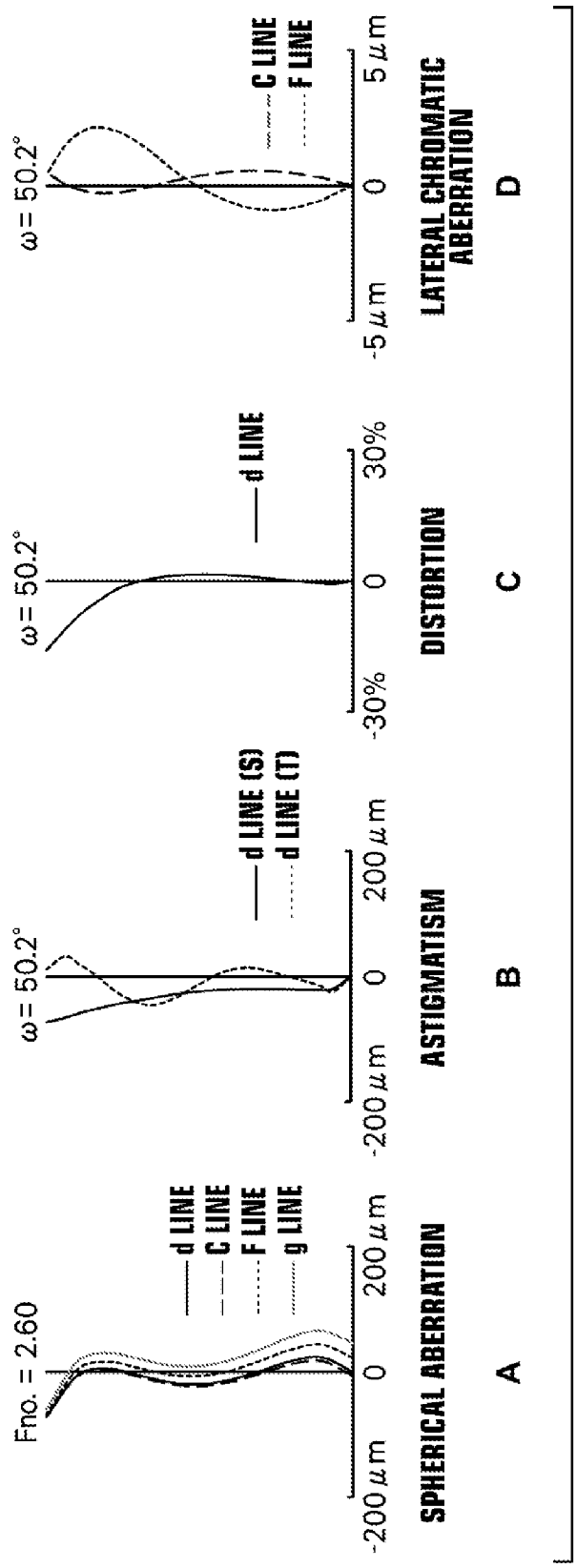

A through D of FIG. 14 are diagrams that illustrate aberrations of the imaging lens of Example 3, wherein A illustrates spherical aberration, B illustrates astigmatism (field curvature), C illustrates distortion, and D illustrates lateral chromatic aberration.

Figure 15:
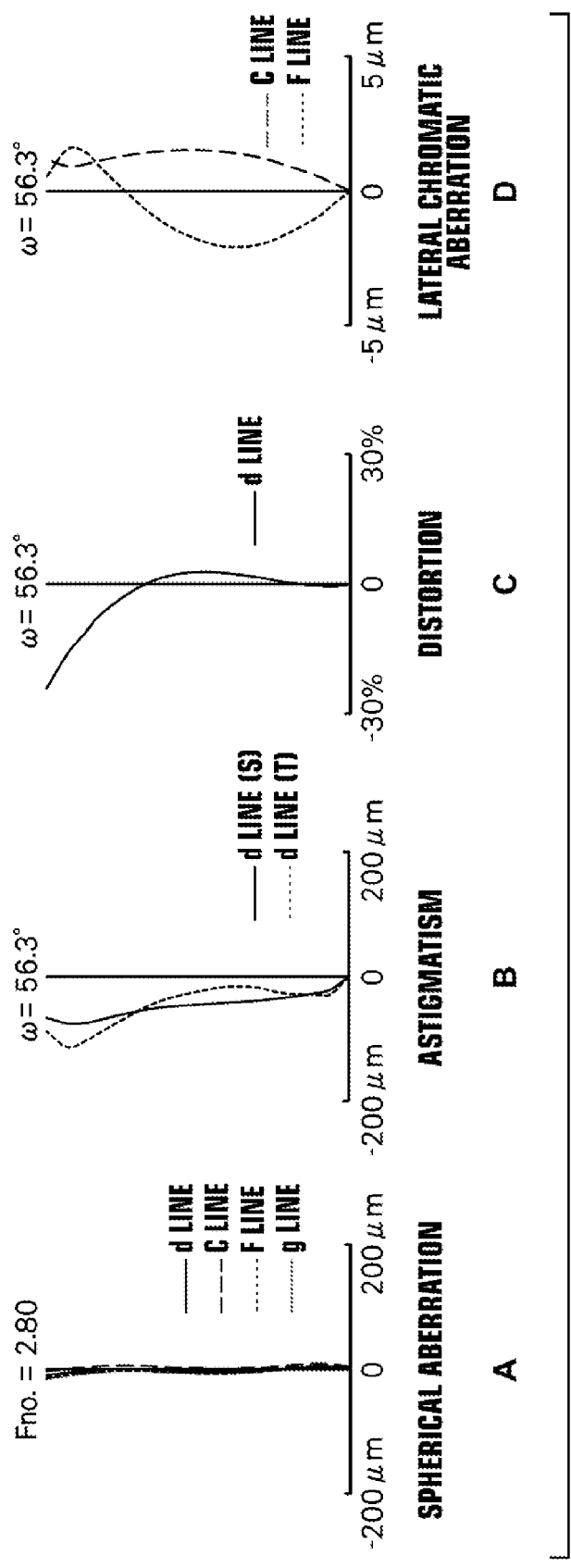

A through D of FIG. 15 are diagrams that illustrate aberrations of the imaging lens of Example 4, wherein A illustrates spherical aberration, B illustrates astigmatism (field curvature), C illustrates distortion, and D illustrates lateral chromatic aberration.

Figure 16:
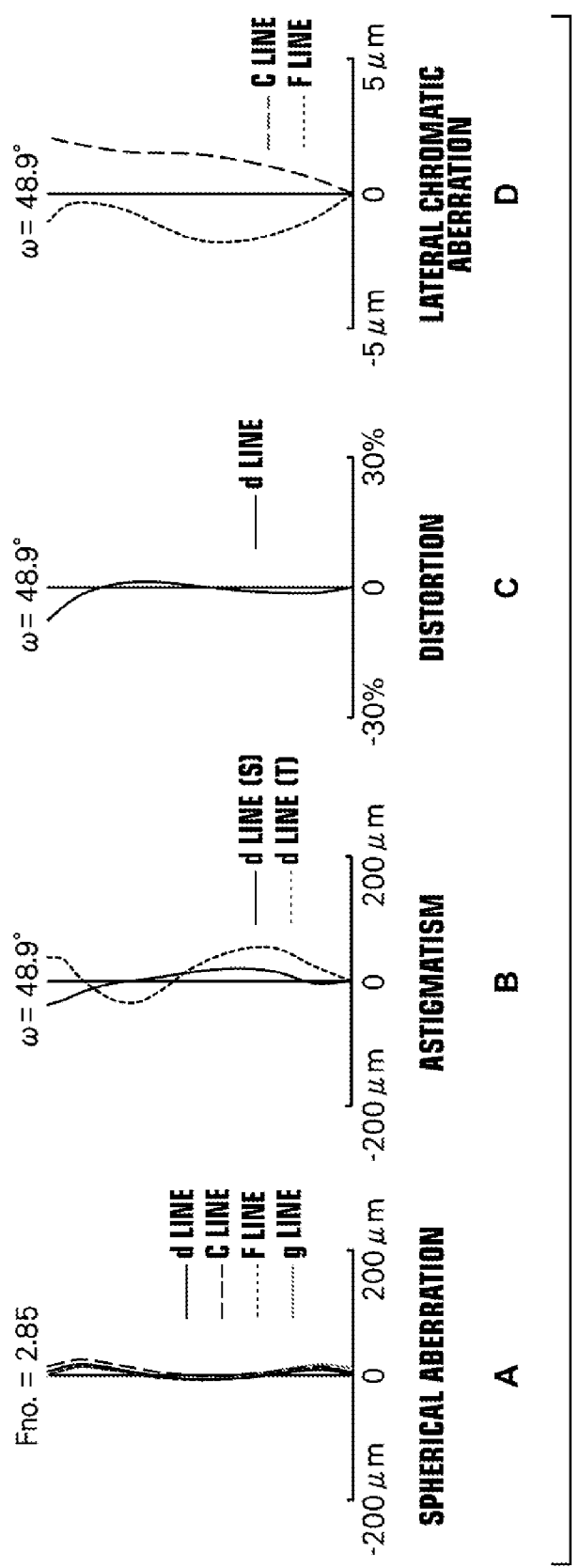

A through D of FIG. 16 are diagrams that illustrate aberrations of the imaging lens of Example 5, wherein A illustrates spherical aberration, B illustrates astigmatism (field curvature), C illustrates distortion, and D illustrates lateral chromatic aberration.

Figure 17:
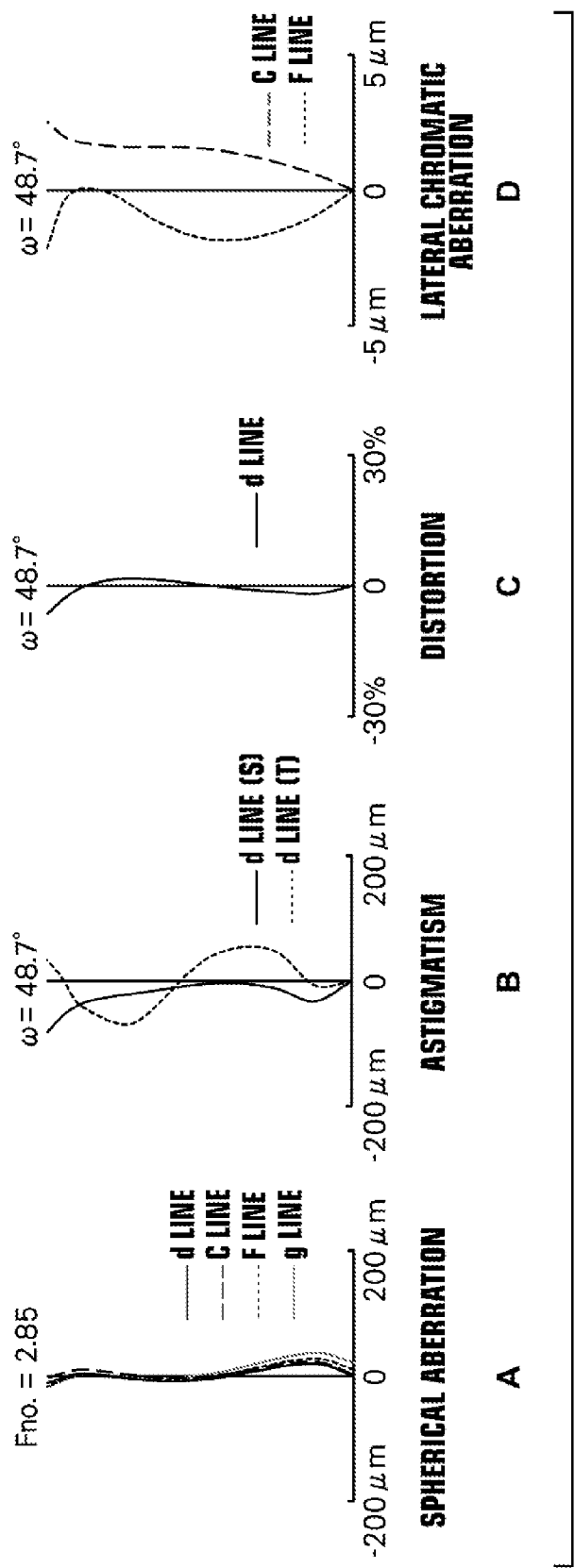

A through D of FIG. 17 are diagrams that illustrate aberrations of the imaging lens of Example 6, wherein A illustrates spherical aberration, B illustrates astigmatism (field curvature), C illustrates distortion, and D illustrates lateral chromatic aberration.

Figure 18:
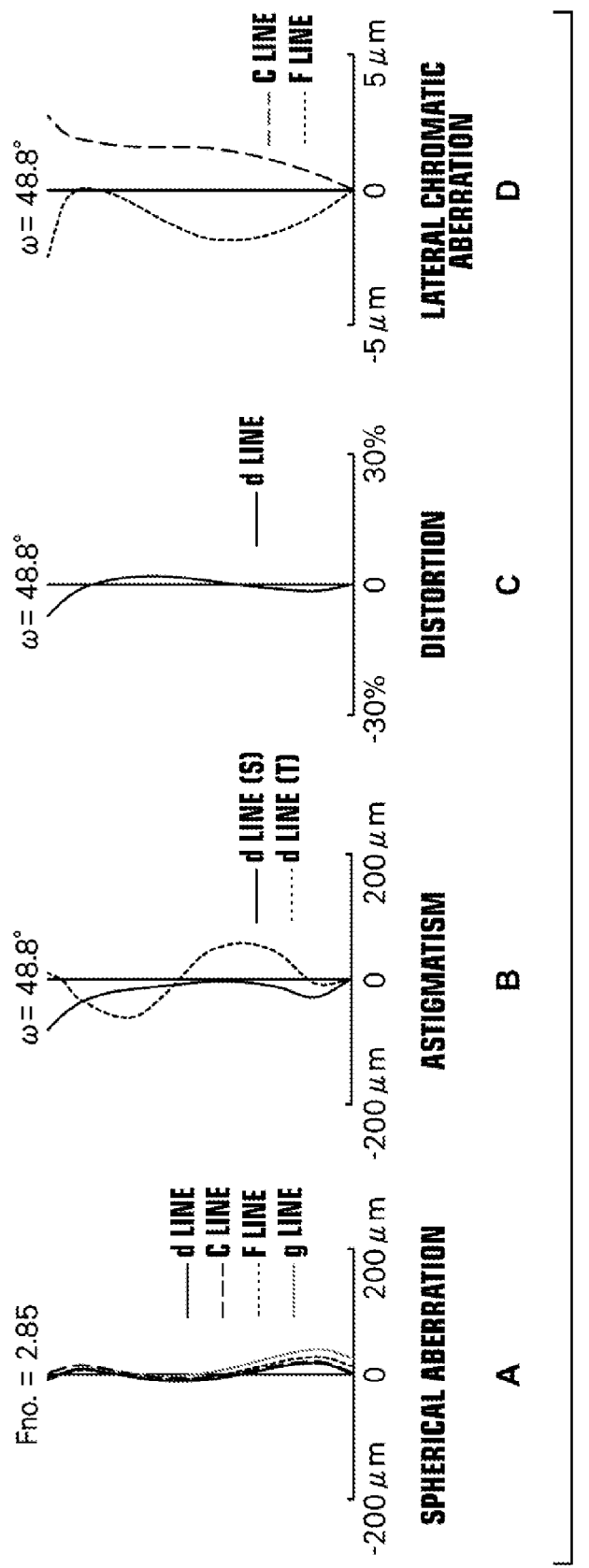

A through D of FIG. 18 are diagrams that illustrate aberrations of the imaging lens of Example 7, wherein A illustrates spherical aberration, B illustrates astigmatism (field curvature), C illustrates distortion, and D illustrates lateral chromatic aberration.

Figure 19:
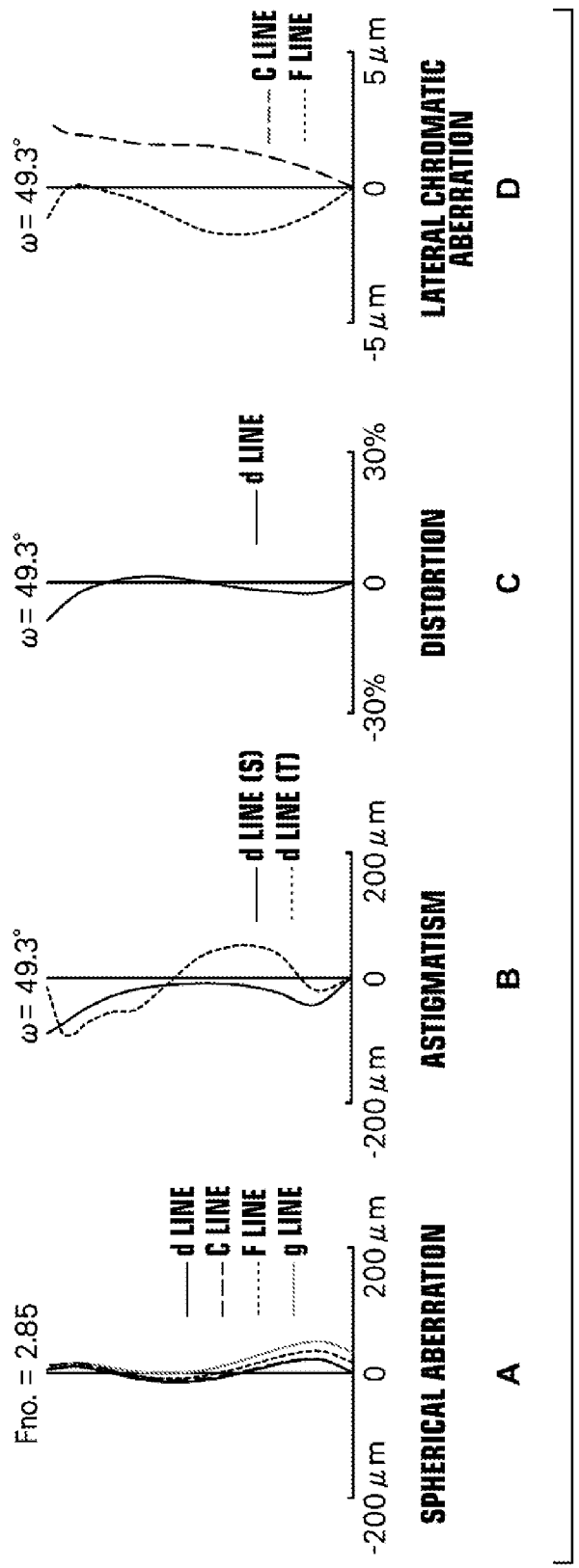

A through D of FIG. 19 are diagrams that illustrate aberrations of the imaging lens of Example 8, wherein A illustrates spherical aberration, B illustrates astigmatism (field curvature), C illustrates distortion, and D illustrates lateral chromatic aberration.

Figure 20:
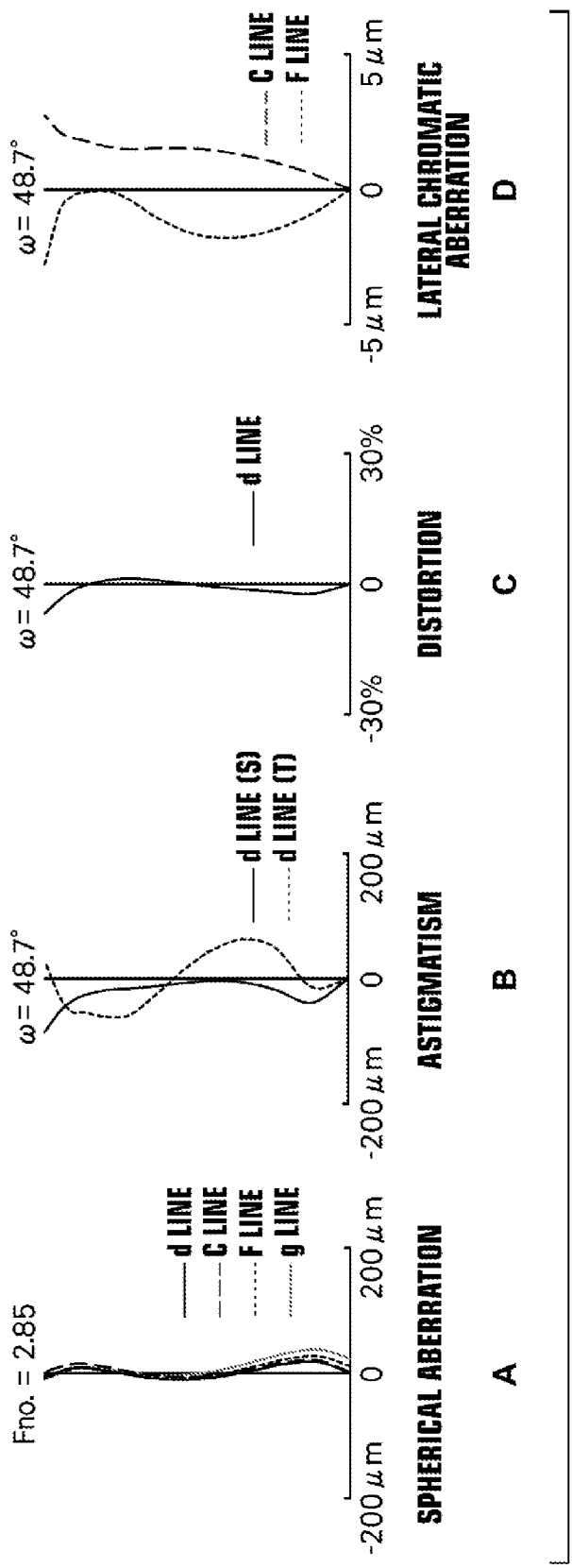

A through D of FIG. 20 are diagrams that illustrate aberrations of the imaging lens of Example 9, wherein A illustrates spherical aberration, B illustrates astigmatism (field curvature), C illustrates distortion, and D illustrates lateral chromatic aberration.

Figure 21:
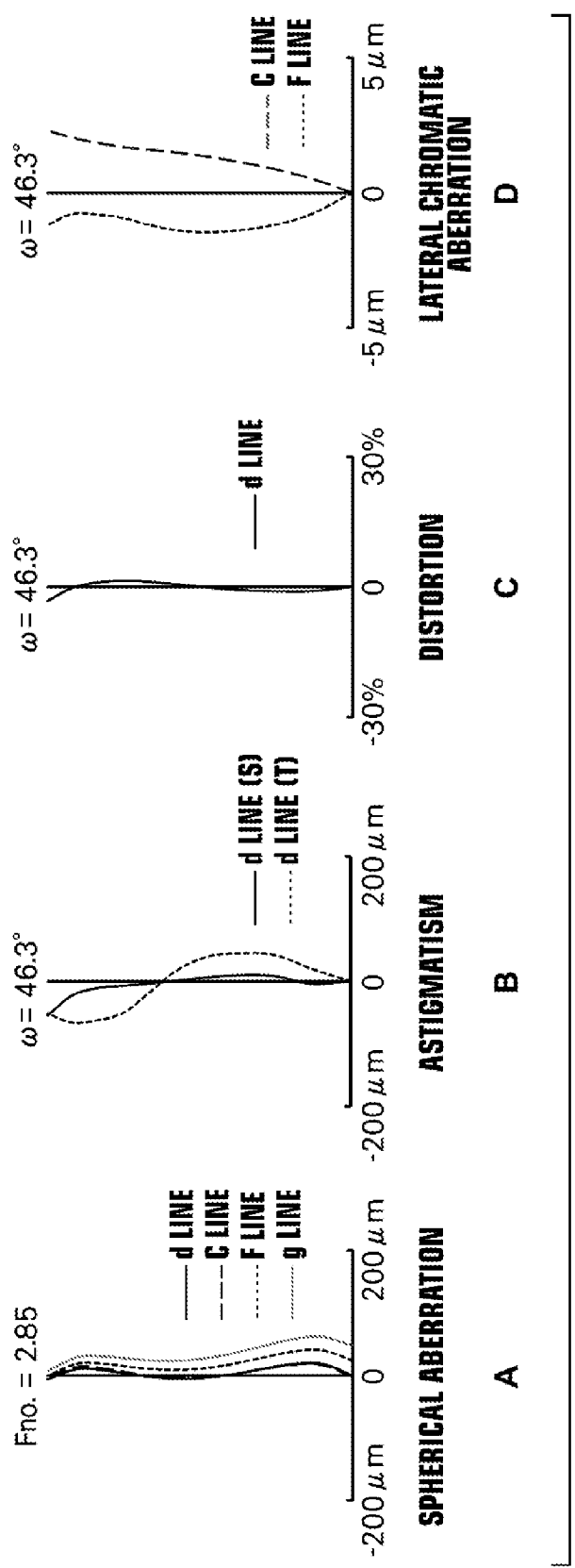

A through D of FIG. 21 are diagrams that illustrate aberrations of the imaging lens of Example 10, wherein A illustrates spherical aberration, B illustrates astigmatism (field curvature), C illustrates distortion, and D illustrates lateral chromatic aberration.

Figure 22:
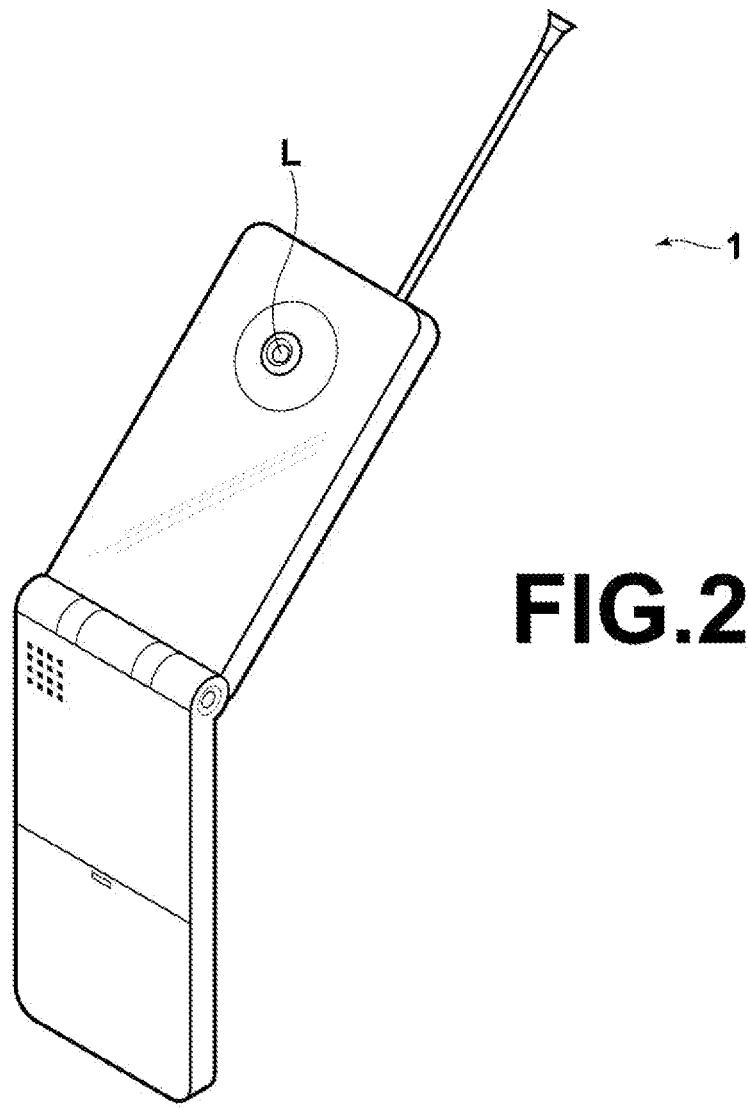

FIG. 22 is a diagram that illustrates a cellular telephone as an imaging apparatus equipped with the imaging lens of the present invention.

Figure 23:
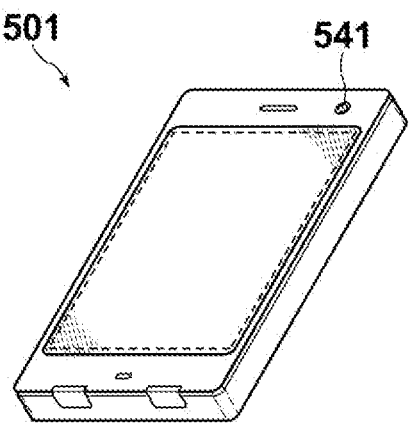

FIG. 23 is a diagram that illustrates a smart phone as an imaging apparatus equipped with the imaging lens of the present invention.

BEST MODE FOR CARRYING OUT THE INVENTION

Hereinafter, embodiments of the present invention will be described in detail with reference to the attached drawings.

Figure 1:
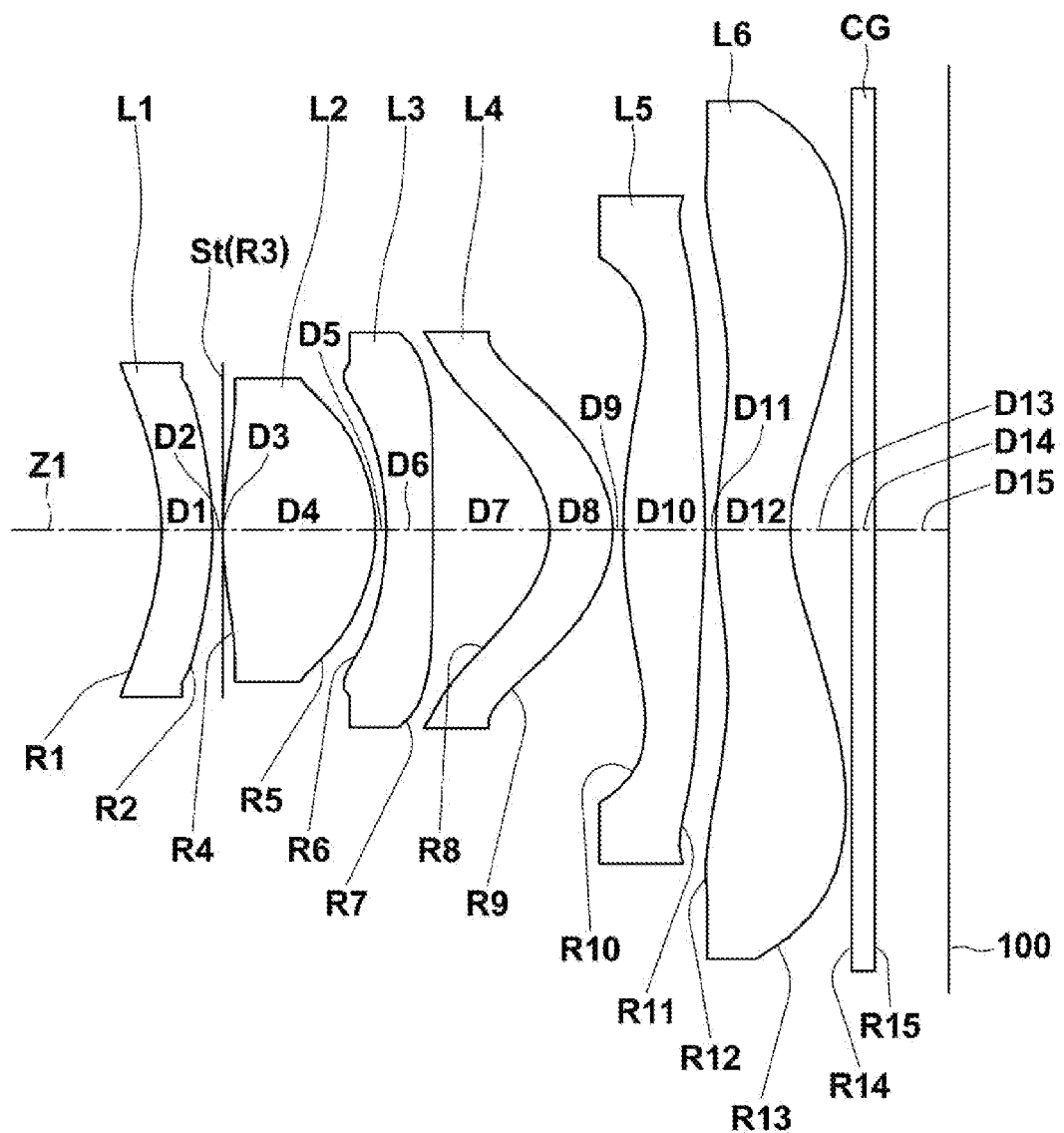
FIG. 1 is a sectional diagram that illustrates a first example of the configuration of an imaging lens according to an embodiment of the present invention, and corresponds to a lens of Example 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 10 are sectional diagrams that illustrate second through eleventh examples of lens configurations that correspond to Numerical Examples 2 through 10 (Table 3 through Table 20). In FIGS. 1 through 10, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 10 will also be described as necessary. In addition, FIG. 11 is a diagram that illustrates the paths of light rays that pass through the imaging lens L of FIG. 1, and illustrates the paths of axial light beams 2 from an object at a distance of infinity.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5 and a sixth lens L6, provided in this order from the object side.

FIG. 22 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

FIG. 23 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. Thereby, the number of parts can be reduced, and the total length can be shortened.

The imaging lens L is equipped with an aperture stop St positioned at the object side of the surface of the third lens L3 toward the object side. By positioning the aperture stop St at the object side of the surface of the third lens L3 toward the object side in this manner, increases in the incident angles of light rays that pass through the optical system and enter the image formation plane (imaging element) can be suppressed, particularly at peripheral portions of an imaging region. It is preferable for the apertures stop St to be positioned at the object side of the surface of the second lens toward the object side in the direction of the optical axis, in order to cause this advantageous effect to become more prominent. Note that the expression "positioned at the object side of the surface of the third lens toward the object side" means that the position of the aperture stop in the direction of the optical axis is at the same position as the intersection of marginal axial rays of light and the surface of the third lens L3 toward the object side, or more toward the object side than this position. Similarly, the expression "positioned at the object side of the surface of the second lens toward the object side" means that the position of the aperture stop in the direction of the optical axis is at the same position as the intersection of marginal axial rays of light and the surface of the second lens L2 toward the object side, or more toward the object side than this position.

In the imaging lens L, the first lens L1 has a negative refractive power in the vicinity of the optical axis. In addition, the first lens L1 has a concave surface toward the object side in the vicinity of the optical axis. By the first lens L1 having a negative refractive power and a concave surface toward the object side in the vicinity of the optical axis, the angles of light beams at peripheral angles of view that pass through the peripheral portion of the first lens L1 with respect to the optical axis when entering the second lens L2 (incident angles with respect to a plane having the optical axis as a normal line) can be decreased. Therefore, the generation of higher order aberrations can be suppressed, and realization of a wider angle of view is facilitated. In addition, by the first lens L1 having a concave surface toward the object side in the vicinity of the optical axis, the position of the rearward principal point of the first lens L1 can be closer to the image side, and a necessary amount of back focus can be easily secured. It is preferable for the first lens L1 to be of a meniscus shape having a concave surface toward the object side in the vicinity of the optical axis, in order to cause these advantageous effects to become more prominent.

The second lens L2 has a positive refractive power in the vicinity of the optical axis. Thereby, the total length can be favorably shortened. In addition, the second lens L2 configures the main portion of the positive refractive power of the imaging lens. In addition, it is preferable for the second lens L2 to be of a biconvex shape in the vicinity of the optical axis, as shown in Example 1. In the case that the second lens L2 is of a biconvex shape in the vicinity of the optical axis, sufficient positive refractive power can be maintained while spherical aberration can be favorably corrected.

The third lens L3 has a negative refractive power in the vicinity of the optical axis. Thereby, spherical aberration and longitudinal chromatic aberration can be favorably corrected. In addition, it is preferable for the third lens L3 to be of a meniscus shape having a concave surface toward the object side in the vicinity of the optical axis, as shown in Example 1. In the case that the third lens L3 is of a meniscus shape having a concave surface toward the object side in the vicinity of the optical axis, a surface having a negative refractive power in the vicinity of the optical axis is positioned at the object side, and a surface having a positive refractive power in the vicinity of the optical axis is positioned at the image side in the third lens L3. Therefore, the position of the rearward principal point of the third lens L3 can be closer to the image side, and a necessary amount of back focus can be easily secured.

The fourth lens L4 has a negative refractive power in the vicinity of the optical axis. Thereby, astigmatism can be favorably corrected. In order to cause this effect to become more prominent, the fourth lens L4 is of a meniscus shape having a concave surface toward the object side in the vicinity of the optical axis. Astigmatism can be favorably corrected and a widening of the angle of view can be favorably realized, by the fourth lens L4 having a concave surface toward the object side in the vicinity of the optical axis.

The fifth lens L5 may have a negative refractive power or a positive refractive power in the vicinity of the optical axis, as long as it is capable of correcting various aberrations which are generated when light rays pass through the first lens L1 through the fourth lens L4 in a balanced manner. For example, it is preferable for the fifth lens L5 to be of a biconvex shape, as in Example 1. In this case, the total length can be favorably shortened, and excessive increases in incident angles with respect to the imaging element can be favorably suppressed, particularly at intermediate angles of view, and increases in incident angles into the imaging element can be favorably suppressed from a central angle of view through peripheral angles of view. The tendency for incident angles into imaging element to increase accompanying increases in the angle of view is significant, particularly in imaging lenses having short total lengths such as those employed in cellular telephones and the like. It is important to prevent various problems caused by the increase in incident angles, such as deterioration of light receiving efficiency and color mixing. Therefore, suppressing incident angles with respect to the imaging element such that they do not become excessively great from a central angle of view through peripheral angles of view in this manner is extremely preferable.

It is preferable for the sixth lens L6 to have a negative refractive power in the vicinity of the optical axis. By the sixth lens L6 having a negative refractive power in the vicinity of the optical axis, the total length can be shortened, while field curvature can be favorably corrected. In addition, it is preferable for the sixth lens L6 to have a concave surface toward the image side in the vicinity of the optical axis, in order to cause these advantageous effects to become more prominent. In addition, it is more preferable for the sixth lens L6 to be of a meniscus shape having a concave surface toward the image side in the vicinity of the optical axis. The sixth lens L6 has a concave surface toward the image side, and the surface thereof toward the image side is of an aspherical shape having at least inflection point thereon. In the case that the sixth lens L6 has a concave surface toward the image side, increases in the incident angles of light rays that pass through the optical system and enter the image formation surface (imaging element) can be suppressed, particularly at the peripheral portions of the imaging region, by the surface of the sixth lens L6 being of an aspherical shape having at least one inflection point. It is preferable for the sixth lens L6 to be of a meniscus shape having a concave surface toward the image side in the vicinity of the optical axis, and for both surfaces of the sixth lens L6 to be aspherical and to have inflection points thereon, in order to cause this advantageous effect to become more prominent. Example 1 is an example of a configuration in which the sixth lens L6 has a negative refractive power in the vicinity of the optical axis, is of a meniscus shape having a concave surface toward the image side in the vicinity of the optical axis, and in which both surfaces are aspherical in shape and have an inflection point thereon.

Next, the operation and effects of conditional formulae related to the imaging lens L will be described in greater detail.

First, it is preferable for the paraxial radius of curvature R1f of the surface of the first lens L1 toward the object side and the paraxial radius of curvature R1r of the surface of the first lens L1 toward the image side to satisfy Conditional Formula (1) below.

$$-1<(R1f-R1r)/(R1f+R1r)<0 \qquad (1)$$

Conditional Formula (1) defines preferred ranges of numerical values for the paraxial radius of curvature R1f of the surface of the first lens L1 toward the object side and the paraxial radius of curvature R1r of the surface of the first lens L1 toward the image side. In the case that the value of (R1f−R1r)/(R1f+R1r) is less than the lower limit defined in Conditional Formula (1), the length along the optical axis at which the first lens L1 is to be provided will increase, which is disadvantageous from the viewpoint of shortening the total length. In addition, in the case that the value of (R1f−R1r)/(R1f+R1r) is greater than the upper limit defined in Conditional Formula (1), sufficient correction of distortion and lateral chromatic aberration will become difficult. For these reasons, the total length can be favorably shortened, while distortion and lateral chromatic aberration can be favorably corrected, by Conditional Formula (1) being satisfied. From the above viewpoint, it is more preferable for Conditional Formula (1-1) below to be satisfied, and even more preferable for Conditional Formula (1-2) below to be satisfied.

$$-0.5<(R1f-R1r)/(R1f+R1r)<-0.05 \qquad (1\text{-}1)$$

$$-0.4<(R1f-R1r)/(R1f+R1r)<-0.01 \qquad (1\text{-}2)$$

Further, in the case that the aperture stop St is positioned at the object side of the surface of the surface of the third lens L3 toward the object side and at the image side of the surface of the first lens L1 toward the object side and the value of (R1f−R1r)/(R1f+R1r) is less than the lower limit defined in Conditional Formula (1), vignetting of peripheral light beams of the third lens L3 by the aperture stop St will increase, and it will be difficult to sufficiently secure light that passes through the peripheral portion of the third lens L3. For this reason, it is preferable for the lower limit of Conditional Formula (1) to be satisfied, more preferable for the lower limit of Conditional Formula (1-1) to be satisfied, and even more preferable for the lower limit of Conditional Formula (1-2) to be satisfied, in the case that the aperture stop St is positioned at the object side of the surface of the surface of the third lens L3 toward the object side and at the image side of the surface of the first lens L1 toward the object side.

In addition, it is preferable for the focal length f of the entire system and the focal length f2 of the second lens L2 to satisfy Conditional Formula (2) below:

$$1<f/f2<3 \qquad (2)$$

Conditional Formula (2) defines a preferable range of numerical values for the focal length f of the entire system with respect to the focal length f2 of the second lens L2. In the case that the value of f/f2 is less than the lower limit defined in Conditional Formula (2), the positive refractive power of the second lens L2 will become excessively weak with respect to the refractive power of the entire system, and shortening of the total length will become difficult. In the case that the value of f/f2 is greater than the upper limit defined in Conditional Formula (2), the positive refractive power of the second lens L2 will become excessively strong with respect to the refractive power of the entire system, which is disadvantageous from the viewpoint of correcting spherical aberration. The total length can be favorably shortened, while spherical aberration can be favorably corrected, by Conditional Formula (2) being satisfied. From the above viewpoint, it is more preferable for Conditional Formula (2-1) below to be satisfied, and even more preferable for Conditional Formula (2-2) below to be satisfied.

$$1.3<f/f2<2.5 \qquad (2\text{-}1)$$

$$1.4<f/f2<2.2 \qquad (2\text{-}2)$$

In addition, it is preferable for the focal length f3 of the third lens L3 and the focal length f1 of the first lens L1 to satisfy Conditional Formula (3) below:

$$0<f3/f1<0.5 \qquad (3)$$

Conditional Formula (3) defines a preferable range of numerical values for the focal length f3 of the third lens L3 with respect to the focal length f1 of the first lens L1. In the case that the value of f3/f1 is less than the lower limit defined in Conditional Formula (3), sufficient correction of distortion and lateral chromatic aberration will become difficult, and realizing a wider angle of view will become difficult. In the case that the value of f3/f1 is greater than the upper limit defined in Conditional Formula (3), the negative refractive power of the first lens L1 will become excessively strong with respect to the refractive power of the third lens L3, which is disadvantageous from the viewpoint of shortening the total length. Distortion and lateral chromatic aberration can be favorably corrected, and a shortening of the total length and a widening of the angle of view can be realized, by Conditional Formula (3) being satisfied. From the above viewpoint, it is more preferable for Conditional Formula (3-1) below to be satisfied, and even more preferable for Conditional Formula (3-2) below to be satisfied.

$$0<f3/f1<0.3 \qquad (3\text{-}1)$$

$$0.05<f3/f1<0.2 \qquad (3\text{-}2)$$

In addition, it is preferable for the focal length f3 of the third lens L3 and the focal length f4 of the fourth lens L4 to satisfy Conditional Formula (4) below:

$$0<f3/f4<1.2 \qquad (4)$$

Conditional Formula (4) defines a preferable range of numerical values for the focal length f3 of the third lens L3 with respect to the focal length f4 of the fourth lens L4. In the case that the value of f3/f4 is less than the lower limit defined in Conditional Formula (4), it will become difficult to sufficiently correct astigmatism. In the case that the value of f3/f4 is greater than the upper limit defined in Conditional Formula (4), the negative refractive power of the fourth lens L4 will become excessively strong with respect to the refractive power of the third lens L3, which is disadvantageous from the viewpoint of correcting lateral chromatic aberration. Astigmatism and lateral chromatic aberration can be favorably corrected, by Conditional Formula (4) being satisfied. From the above viewpoint, it is more preferable for Conditional Formula (4-1) below to be satisfied, and even more preferable for Conditional Formula (4-2) below to be satisfied.

$$0<f3/f4<0.8 \qquad (4\text{-}1)$$

$$0<f3/f4<0.6 \qquad (4\text{-}2)$$

In addition, the paraxial radius of curvature R6r of the surface of the sixth lens L6 toward the image side and the focal length f of the entire system satisfy Conditional Formula (5) below.

$$1<f/R6r<4 \qquad (5)$$

Conditional Formula (5) defines a preferable range of numerical values for the ratio of the focal length f of the entire system with respect to the paraxial radius of curvature R6r of the surface of the sixth lens L6 toward the image side. In the case that the value of f/R6r is less than the lower limit defined in Conditional Formula (5), such a configuration is disadvantageous from the viewpoint of shortening the total length. In addition, because the sixth lens L6 has a concave surface toward the image side in the vicinity of the optical axis and the surface of the sixth lens L6 toward the image side has an inflection point thereon, in the case that the value of f/R6r is greater than the upper limit defined in Conditional Formula (5), it will become necessary to increase the degree to which the positive refractive power in the vicinity of the optical axis changes to a negative refractive power toward the peripheral portion of the surface of the sixth lens L6 toward the image side, in order to suppress increases of incident angles with respect to the imaging element at peripheral angles of view. However, in the case that the degree to which the refractive power of the surface of the sixth lens L6 toward the image side changes when the value of f/R6r is greater than the upper limit defined in Conditional Formula (5), it will become difficult to sufficiently correct field curvature and distortion at intermediate angles of view. For these reasons, the total length can be favorably shortened while favorably correcting field curvature and distortion at intermediate angles of view, by Conditional Formula (5) being satisfied. From the above viewpoint, it is more preferable for Conditional Formula (5-1) below to be satisfied, and even more preferable for Conditional Formula (5-2) below to be satisfied.

$$1.5 < f/R6r < 3 \tag{5-1}$$

$$1.8 < f/R6r < 2.8 \tag{5-2}$$

In addition, it is preferable for the paraxial radius of curvature R4f of the surface of the fourth lens L4 toward the object side and the paraxial radius of curvature R4r of the surface of the fourth lens L4 toward the image side to satisfy Conditional Formula (6) below.

$$-0.5 < (R4f - R4r)/(R4f + R4r) < 0 \tag{6}$$

Conditional Formula (6) defines preferred ranges of numerical values for the paraxial radius of curvature R4f of the surface of the fourth lens L4 toward the object side and the paraxial radius of curvature R4r of the surface of the fourth lens L4 toward the image side. In the case that the value of (R4f−R4r)/(R4f+R4r) is less than the lower limit defined in Conditional Formula (6), such a configuration is disadvantageous from the viewpoint of correcting astigmatism. In the case that the value of (R4f−R4r)/(R4f+R4r) is greater than the upper limit defined in Conditional Formula (6), such a configuration is disadvantageous from the viewpoint of shortening the total length. For these reasons, astigmatism can be favorably corrected, while the total length can be favorably shortened, by Conditional Formula (6) being satisfied. From the above viewpoint, it is more preferable for Conditional Formula (6-1) below to be satisfied.

$$-0.3 < (R4f - R4r)/(R4f + R4r) < 0.05 \tag{6-1}$$

In addition, it is preferable for the Abbe's number vd1 of the first lens L1 with respect to the d line to satisfy Conditional Formula (7) below:

$$40 < vd1 \tag{7}$$

Conditional Formula (7) defines a preferable range of numerical values for the Abbe's number vd1 of the first lens L1 with respect to the d line. In the case that the value of vd1 is greater than the upper limit defined in Conditional Formula (7), such a configuration is disadvantageous from the viewpoint of correcting lateral chromatic aberration. Therefore, lateral chromatic aberration can be favorably corrected by Conditional Formula (7) being satisfied.

In addition, it is preferable for the distance TTL from the surface of the first lens toward the object side to the imaging surface along the optical axis and the focal length f of the entire system to satisfy Conditional Formula (8) below:

$$1.0 < TTL/f < 3.0 \tag{8}$$

Conditional Formula (8) defines a preferable range of numerical values for the ratio of the distance TTL from the surface of the first lens toward the object side to the imaging surface along the optical axis (the total length of the lens) with respect to the focal length f of the entire system. Note that the portion corresponding to back focus (the distance from the apex of the surface of the sixth lens toward the image side to the imaging surface along the optical axis) in the distance TTL from the surface of the first lens toward the object side to the imaging surface along the optical axis is an air converted length along the optical axis. In the case that the value of TTL/f is less than the lower limit defined in Conditional Formula (8), correction of various aberrations, particularly field curvature and distortion, will become difficult. In the case that the value of TTL/f is greater than the upper limit defined in Conditional Formula (8), the total length of the lens will become long, resulting in the lens system becoming larger as a whole, which is not preferable. For these reasons, the lens system as a whole can be miniaturized, while various aberrations, particularly field curvature and distortion, can be favorably corrected, by Conditional Formula (8) being satisfied. From the above viewpoint, it is more preferable for Conditional Formula (8-1) below to be satisfied.

$$1.3 < TTL/f < 2.6 \tag{8-1}$$

In addition, it is preferable for the distance TTL from the surface of the first lens toward the object side to the imaging surface along the optical axis to satisfy Conditional Formula (9) below:

$$4.0 < TTL < 6.0 \tag{9}$$

Conditional Formula (9) defines a preferable range of numerical values for the distance TTL from the surface of the first lens toward the object side to the imaging surface along the optical axis. Note that the portion corresponding to back focus (the distance from the apex of the surface of the sixth lens L6 toward the image side to the imaging surface along the optical axis) in the distance TTL from the surface of the first lens toward the object side to the imaging surface along the optical axis is an air converted length along the optical axis. In the case that the value of TTL is less than the lower limit defined in Conditional Formula (9), correction of various aberrations, particularly field curvature and distortion, will become difficult. In the case that the value of TTL is greater than the upper limit defined in Conditional Formula (9), the total length of the lens will become long, resulting in the lens system becoming larger as a whole, which is not preferable. For these reasons, the lens system as a whole can be miniaturized, while various aberrations, particularly field curvature and distortion, can be favorably corrected, by Conditional Formula (9) being satisfied. From the above viewpoint, it is more preferable for Conditional Formula (9-1) below to be satisfied.

$$4.5 < TTL < 5.8 \tag{9-1}$$

In addition, it is preferable for the focal length f of the entire system and the distance BFL from the apex of the surface of the sixth lens L6 toward the image side to the imaging surface along the optical axis to satisfy Conditional Formula (10) below:

$$0.28 < BFL/f < 0.42 \tag{10}$$

Conditional Formula (10) defines a preferable range of numerical values for the ratio of the distance BFL from the apex of the surface of the sixth lens toward the image side to the imaging surface along the optical axis (back focus) with respect to the focal length f of the entire system. Note that the distance BFL from the apex of the surface of the sixth lens L6 toward the image side to the imaging surface along the optical axis is an air converted length along the optical axis. In the case that the value of BFL/f is less than the lower limit defined in Conditional Formula (10), foreign matter which is adhered to the surface of the sixth lens L6 toward the image side will be likely to be pictured in formed images. In the case that the value of BFL/f is greater than the upper limit defined in Conditional Formula (10), the total length will become long, which is not preferable. For these reasons, the total length can be favorably shortened, while various aberrations, particularly field curvature and distortion, can be favorably corrected by Conditional Formula (10) being satisfied. From the above viewpoint, it is more preferable for Conditional Formula (10-1) below to be satisfied.

$$0.30 < BFL/f < 0.40 \tag{10-1}$$

In addition, it is preferable for the distance BFL from the apex of the surface of the sixth lens toward the image side to the imaging surface along the optical axis to satisfy Conditional Formula (11) below:

$$0.75 < BFL < 1.2 \tag{11}$$

Conditional Formula (11) defines a preferable range of numerical values for the distance BFL from the apex of the surface of the sixth lens toward the image side to the imaging surface along the optical axis (back focus). Note that the distance BFL from the apex of the surface of the sixth lens L6 toward the image side to the imaging surface along the optical axis is an air converted length along the optical axis. In the case that the value of BFL is less than the lower limit defined in Conditional Formula (11), foreign matter which is adhered to the surface of the sixth lens L6 toward the image side will be likely to be pictured in formed images. In the case that the value of BFL is greater than the upper limit defined in Conditional Formula (11), the total length will become long, which is not preferable. For these reasons, the total length can be favorably shortened, while various aberrations, particularly field curvature and distortion, can be favorably corrected, by Conditional Formula (11) being satisfied. From the above viewpoint, it is more preferable for Conditional Formula (11-1) below to be satisfied.

$$0.8 < BFL < 1.1 \tag{11-1}$$

In addition, wide angle imaging lenses are desired, particularly in imaging devices such as cellular telephones, in which there are often cases in which photographed images are enlarged by a digital zoom function then employed, in order to realize a wider photography range. For this reason, it is preferable for the configurations of each of the first through sixth lenses of the imaging lens L to be set such that the total angle of view 2ω is 85 degrees or greater. Chinese Utility Model Publication No. 202067015 discloses an imaging lens having a total angle of view of 71.8 degrees, and Japanese Unexamined Patent Publication No. 2004-102083 discloses an imaging lens having a total angle of view of 83.2 degrees. In addition, Japanese Unexamined Patent Publication No. 63(1988)-180927 discloses a variable magnification lens having total angles of view within a range from 34 degrees to 42 degrees, Japanese Unexamined Patent Publication No. 2(1990)-181714 discloses a variable magnification lens having total angles of view within a range from 30.2 degrees to 40.8 degrees, and Japanese Unexamined Patent Publication No. 2(1990)-187716 discloses a variable magnification lens having total angles of view within a range from 31.2 degrees to 40.8 degrees. In contrast, the imaging lenses of Examples 1 through 10 all have total angles of view 2ω of 85 degrees or greater. Therefore, photographed images can be obtained at wide angles of view, and the imaging lens L can be favorably applied to imaging devices having the aforementioned digital zoom function.

Next, the imaging lenses of Example 2 through Example 10 of the present invention will be described in detail with reference to FIGS. 2 through 10. In the imaging lenses of Example 1 illustrated in FIG. 1 and the imaging lenses of Examples 5 through 10 illustrated in FIGS. 5 through 10, all of the surfaces of the first lens L1 through the sixth lens L6 are aspherical. In the imaging lenses of Examples 2 through 4 illustrated in FIGS. 2 through 4, all of the surfaces of the second lens L2 through the sixth lens L6 are aspherical. In addition, each of the imaging lenses of Example 2 through Example 10 of the present invention are constituted by a first lens having a negative refractive power and a concave surface toward the object side, a second lens having a positive refractive power, a third lens having a negative refractive power, a fourth lens having a negative refractive power and is of a meniscus shape with a concave surface toward the object side, a fifth lens, and a sixth lens having a concave surface toward the image side and the surface toward the image side of which is of an aspherical shape having at least one inflection point thereon, provided in this order from the object side, in the same manner as the imaging lens of Example 1. For this reason, only the other detailed configurations of each lens of Examples 2 through 10 will be described. In addition, the operational effects of configurations which are common among Examples 1 through 10 are the same. Therefore, the configurations and the operational effects thereof will be described for lower numbered Examples, and redundant descriptions of the common configurations and the operational effects thereof will be omitted for the other embodiments.

Figure 2:
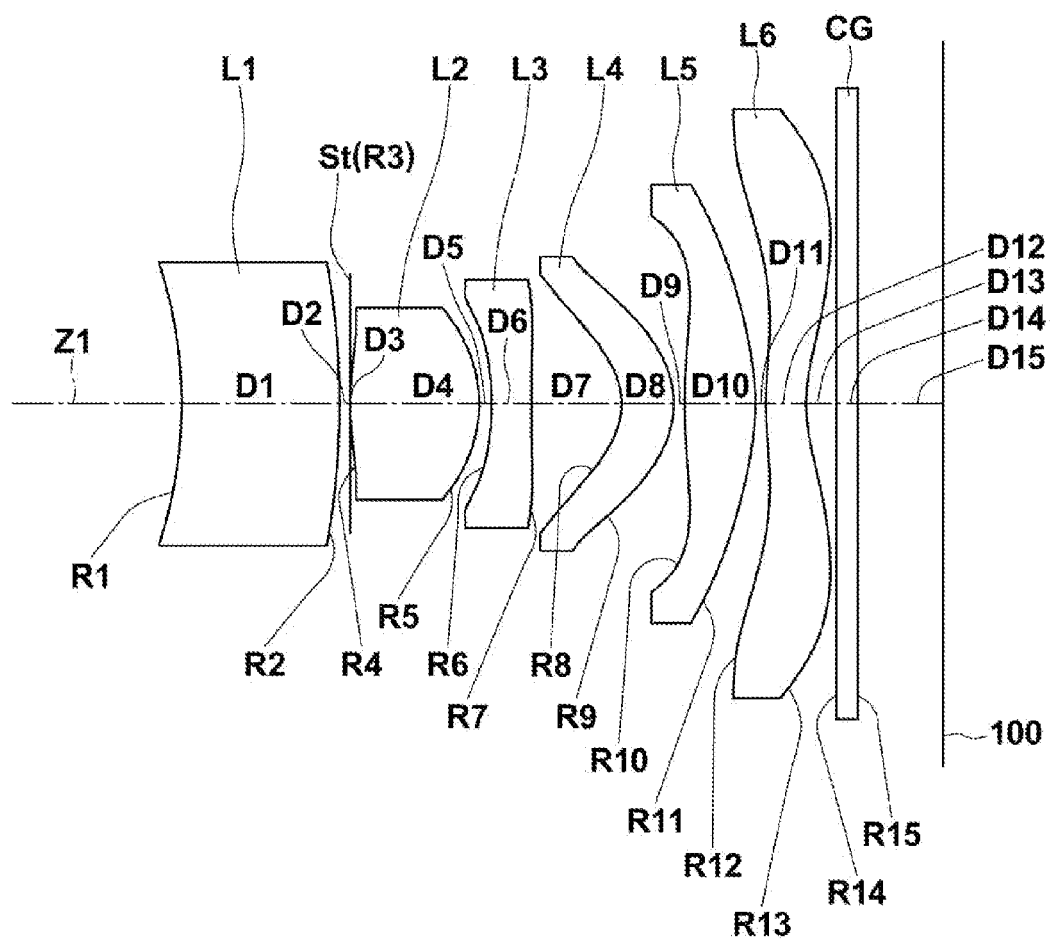
FIG. 2 is a sectional diagram that illustrates a second example of the configuration of an imaging lens according to an embodiment of the present invention, and corresponds to a lens of Example 2.

The third lens L3 may be of a biconcave shape in the vicinity of the optical axis as in Example 2 illustrated in FIG. 2. By the third lens L3 being of a biconcave shape in the vicinity of the optical axis, higher order spherical aberration can be favorably corrected. In addition, the configurations of the first lens L1, the second lens L2 and the fourth lens L4 through the sixth lens L6 of the imaging lens of Example 2 are the same as those of Example 1. The same operational effects corresponding to each of the lens configurations as those obtained by Example 1 are obtained by the imaging lens of Example 2.

Figure 3:
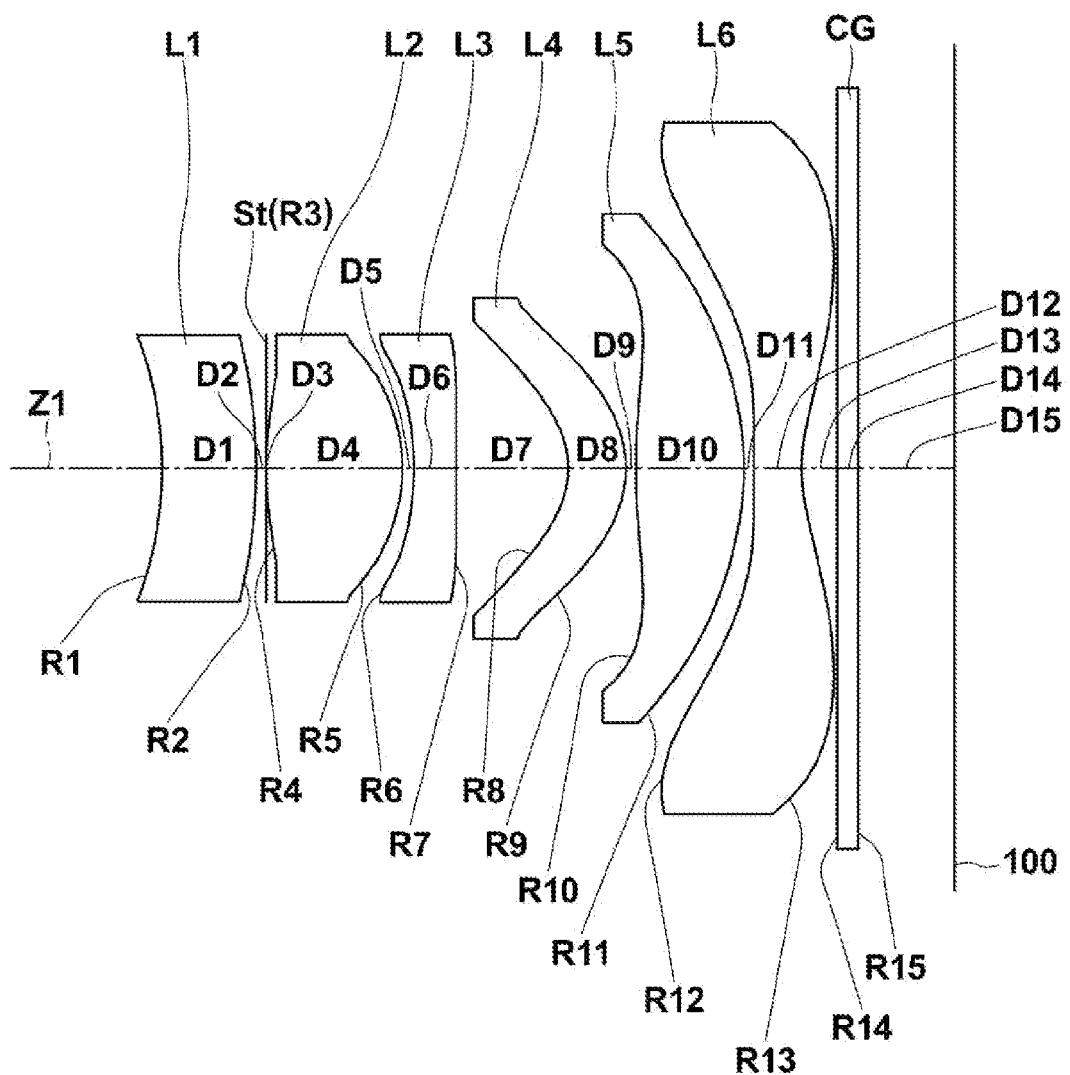
FIG. 3 is a sectional diagram that illustrates a third example of the configuration of an imaging lens according to an embodiment of the present invention, and corresponds to a lens of Example 3.
Figure 4:
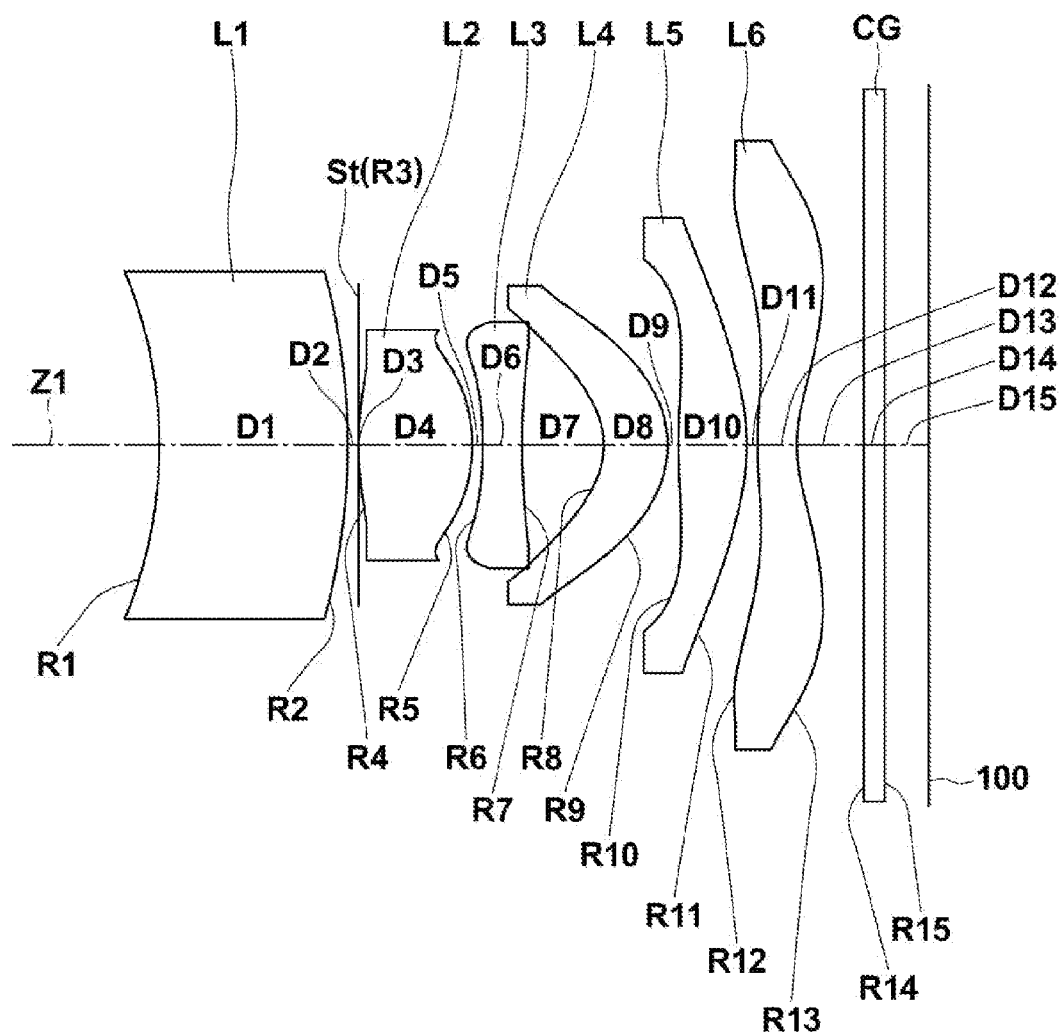
FIG. 4 is a sectional diagram that illustrates a fourth example of the configuration of an imaging lens according to an embodiment of the present invention, and corresponds to a lens of Example 4.

The configurations of the first lens L1 through the sixth lens L6 of the imaging lens of Example 3 illustrated in FIG. 3 and the imaging lens of Example 4 illustrated in FIG. 4 are the same as those of Example 2. The same operational effects corresponding to each of the lens configurations as those obtained by Example 2 are obtained by the imaging lenses of Example 3 and Example 4.

Figure 5:
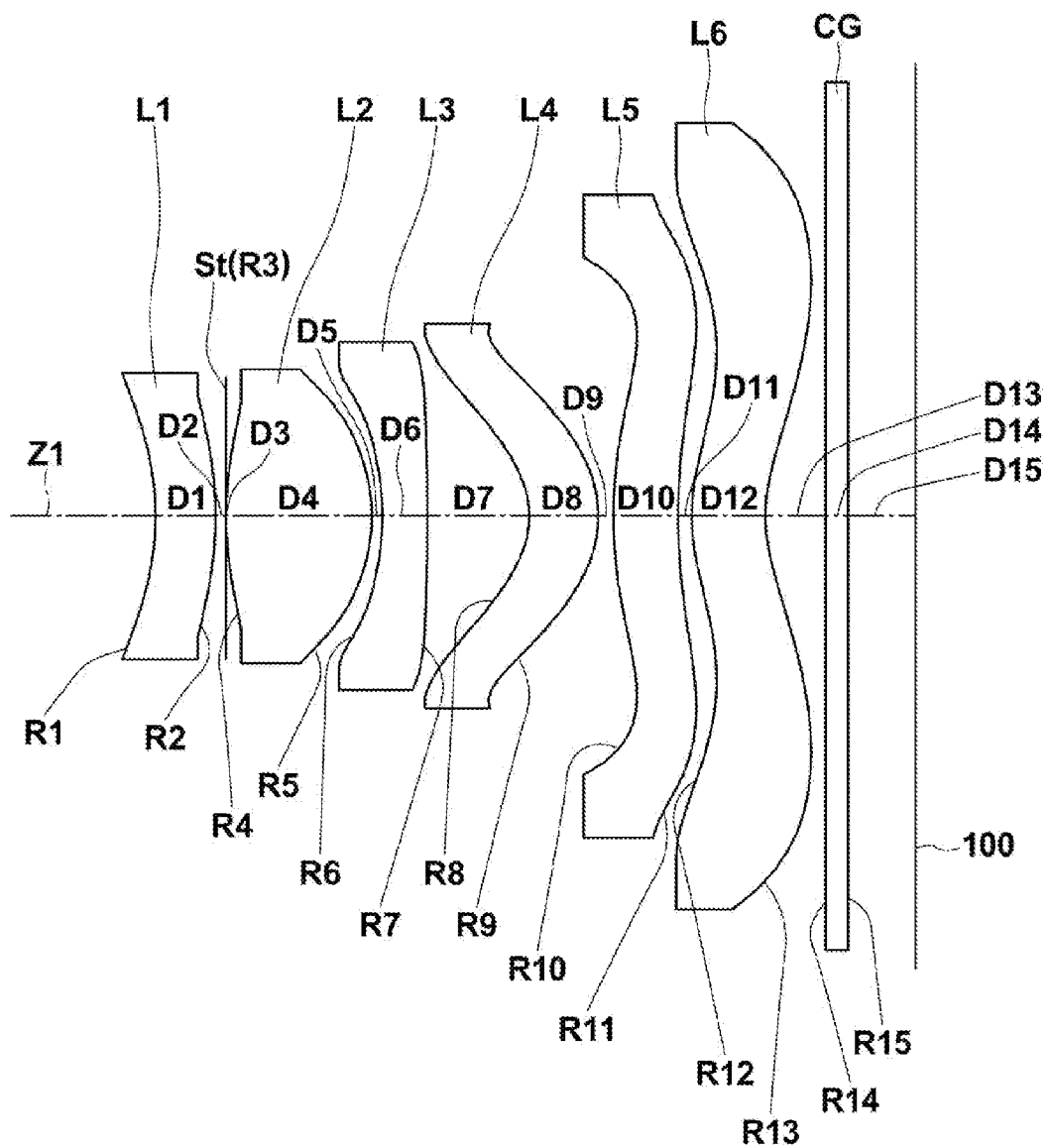
FIG. 5 is a sectional diagram that illustrates a fifth example of the configuration of an imaging lens according to an embodiment of the present invention, and corresponds to a lens of Example 5.

In addition, the fifth lens L5 may have a positive refractive power in the vicinity of the optical axis and be of a meniscus shape with a convex surface toward the object side in the vicinity of the optical axis, as in Example 5 illustrated in FIG. 5. Thereby, the total length can be favorably shortened. In addition, the lens configurations of the first lens L1 through the fourth lens L4 and the sixth lens L6 of the imaging lens of Example 5 are the same as those of Example 1. The same operational effects corresponding to each of the lens configurations as those obtained by Example 1 are obtained by the imaging lens of Example 5.

Figure 6:
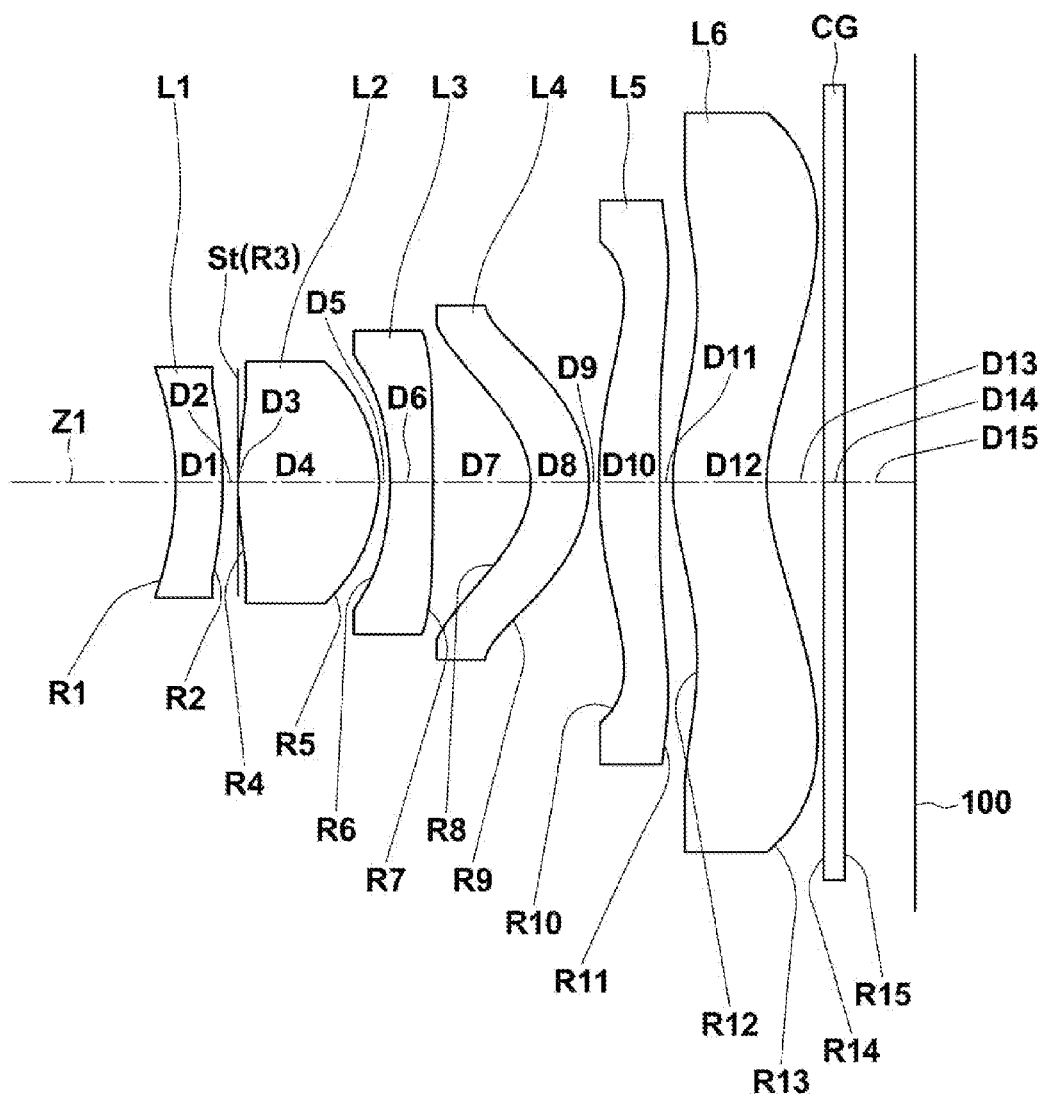
FIG. 6 is a sectional diagram that illustrates a sixth example of the configuration of an imaging lens according to an embodiment of the present invention, and corresponds to a lens of Example 6.

In addition, the sixth lens L6 may have a positive refractive power in the vicinity of the optical axis and be of a meniscus shape with a concave surface toward the image side in the vicinity of the optical axis, as in Example 6 illustrated in FIG. 6. Thereby, the total length can be favorably shortened. In addition, the lens configurations of the first lens L1 through the fifth lens L5 of the imaging lens of Example 6 are the same as those of Example 1. The same operational effects corresponding to each of the lens configurations as those obtained by Example 1 are obtained by the imaging lens of Example 6.

Figure 7:
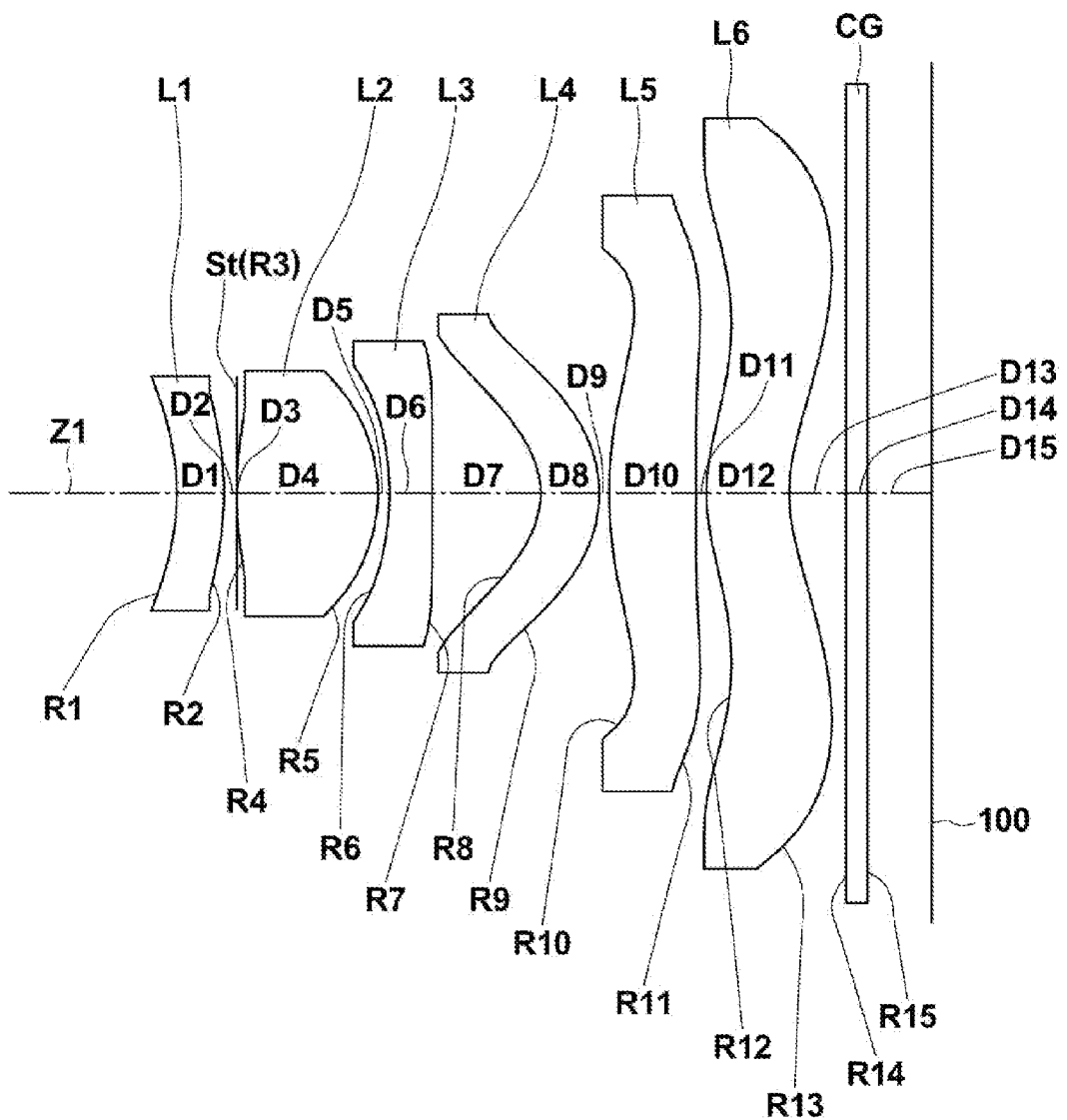
FIG. 7 is a sectional diagram that illustrates a seventh example of the configuration of an imaging lens according to an embodiment of the present invention, and corresponds to a lens of Example 7.

In addition, the lens configurations of the first lens L 1 through the sixth lens L6 of the imaging lens L of Example 7 illustrated in FIG. 7 are the same as those of Example 6. The same operational effects corresponding to each of the lens configurations as those obtained by Example 6 are obtained by the imaging lens of Example 7.

Figure 8:
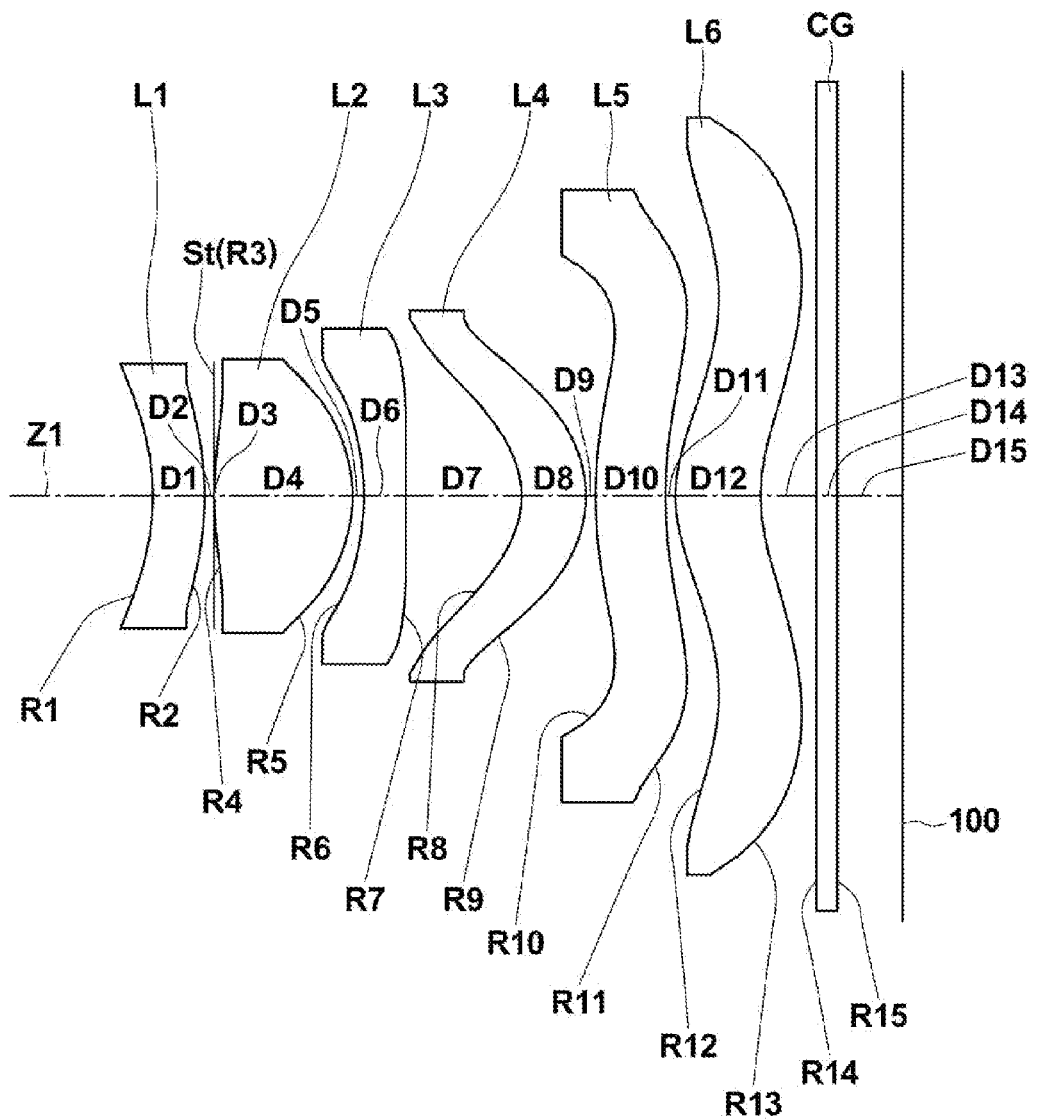
FIG. 8 is a sectional diagram that illustrates an eighth example of the configuration of an imaging lens according to an embodiment of the present invention, and corresponds to a lens of Example 8.

In addition, the fifth lens L5 may have a negative refractive power in the vicinity of the optical axis and be of a meniscus shape with a concave surface toward the image side in the vicinity of the optical axis, as in Example 8 illustrated in FIG. 8. In the case that the fifth lens L5 has a negative refractive power in the vicinity of the optical axis and a concave surface toward the image side in the vicinity of the optical axis, astigmatism can be favorably corrected. In addition, the total length can be favorably shortened, by the fifth lens L5 being of a meniscus shape with a concave surface toward the image side in the vicinity of the optical axis. In addition, the lens configurations of the first lens L1 through the fourth lens L4 and the sixth lens L6 of the imaging lens of Example 8 are the same as those of Example 6. The same operational effects corresponding to each of the lens configurations as those obtained by Example 1 are obtained by the imaging lens of Example 8.

Figure 9:
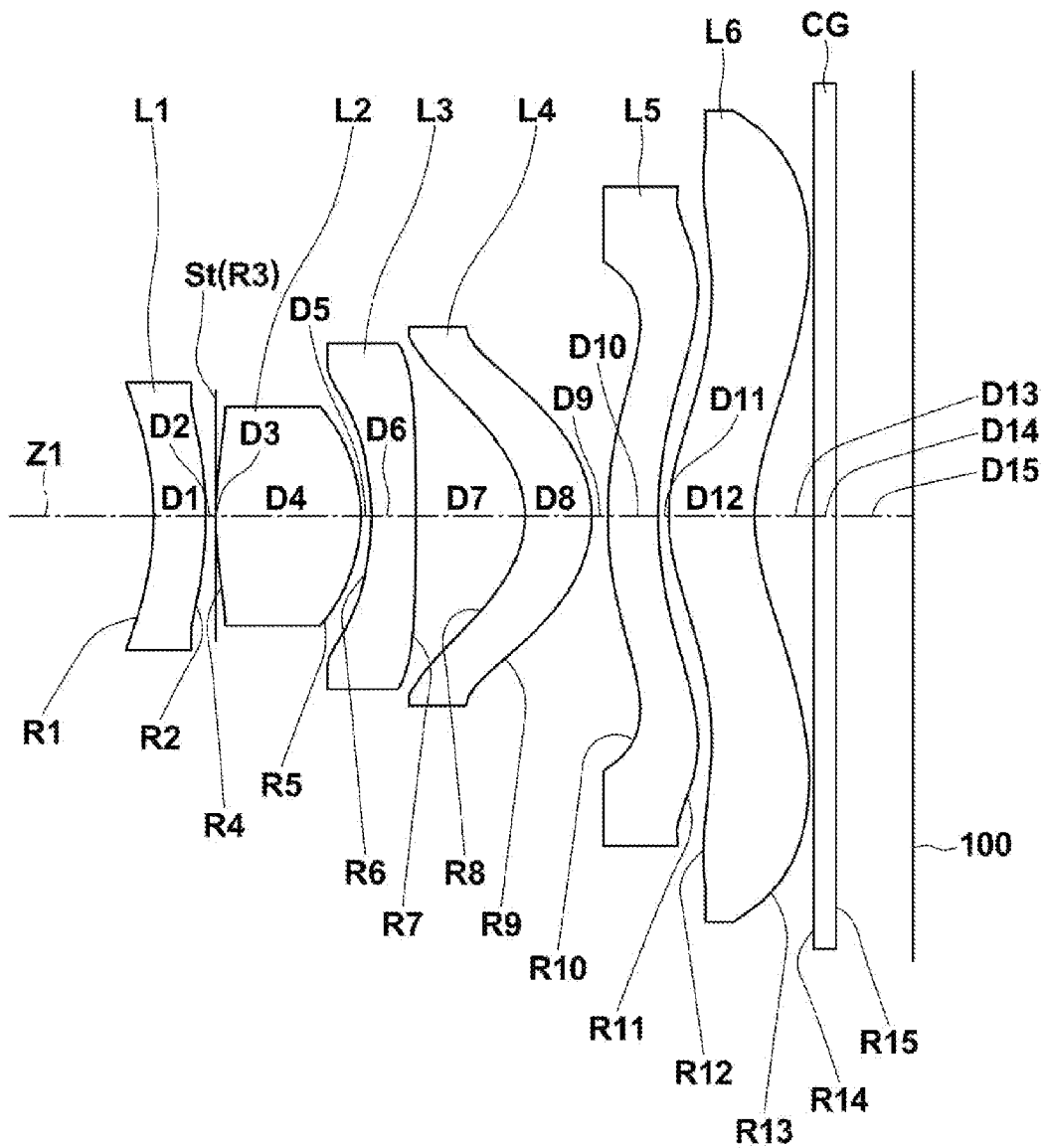
FIG. 9 is a sectional diagram that illustrates a ninth example of the configuration of an imaging lens according to an embodiment of the present invention, and corresponds to a lens of Example 9.

In addition, the lens configurations of the first lens L1 through the sixth lens L6 of the imaging lens L of Example 9 illustrated in FIG. 9 are the same as those of Example 8. The same operational effects corresponding to each of the lens configurations as those obtained by Example 8 are obtained by the imaging lens of Example 9.

Figure 10:
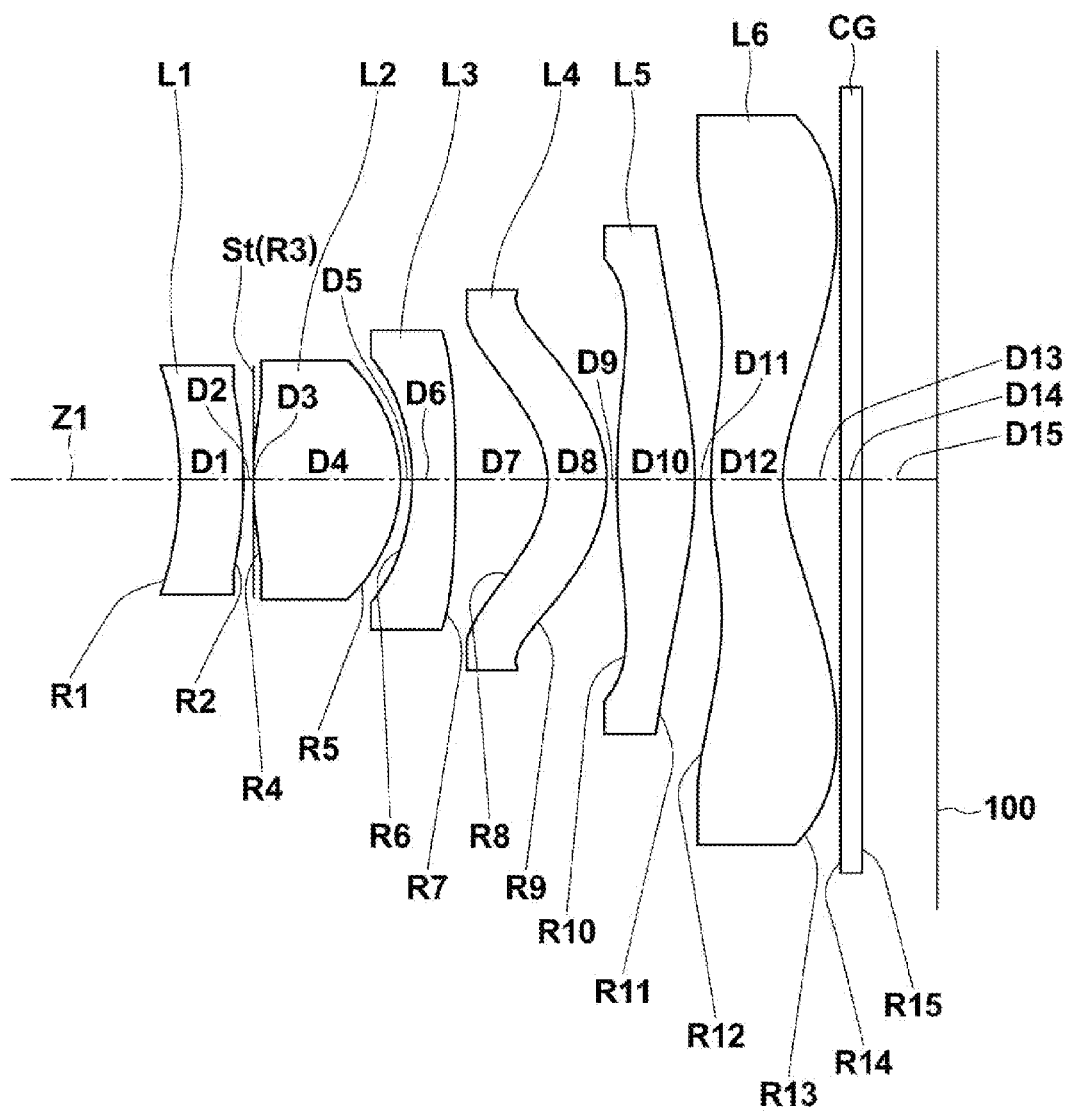
FIG. 10 is a sectional diagram that illustrates a tenth example of the configuration of an imaging lens according to an embodiment of the present invention, and corresponds to a lens of Example 10.
Figure 11:
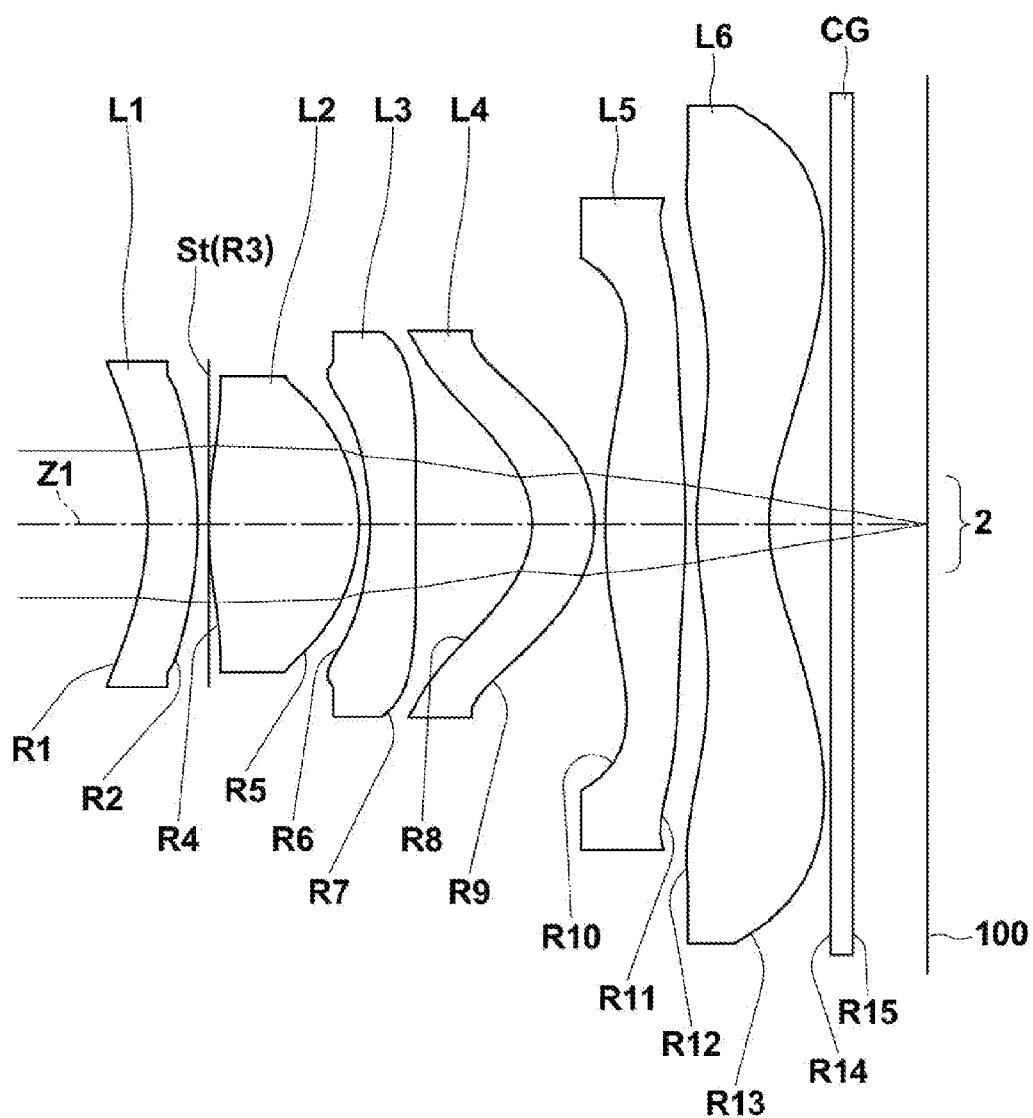
FIG. 11 is a diagram that illustrates the paths of light rays that pass through an imaging lens according to an embodiment of the present invention.

In addition, the lens configurations of the first lens L1 through the sixth lens L6 of the imaging lens L of Example 10 illustrated in FIG. 10 are the same as those of Example 1. The same operational effects corresponding to each of the lens configurations as those obtained by Example 1 are obtained by the imaging lens of Example 10.

As described above, in the imaging lenses L of the Examples of the present invention, the configuration of each lens element is optimized within a lens configuration having six lenses as a whole, and the shape of the first lens is favorably configured in particular. Therefore, a lens system that can achieve a short total length and a wide angle of view while having high imaging performance can be realized.

Further improved imaging performance can be realized by appropriately satisfying preferred conditions. In addition, the imaging apparatuses according to the embodiments of the present invention output image signals corresponding to optical images formed by the high performance imaging lenses L according to the embodiments of the present invention. Therefore, photographed images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Specifically, Table 1 shows basic lens data of the imaging lens, and Table 2 shows data related to aspherical surfaces. In the lens data of Table 1, ith numbers of the surfaces of lens elements that sequentially increase from the object side to the image side, with the lens element at the most object side designated as first (the aperture stop St is first), are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. In addition, Table 1 also shows the focal length f (mm) of the entire system and the back focus BFL (mm) as various data. Note that the back focus BFL is represented as an air converted value.

In the imaging lens of Example 1, both of the surfaces of all of the first lens L 1 through the fifth lens L6 are aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and K represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = C \cdot h^2 / \{1 + (1 - K \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater) and K is an aspherical surface coefficient.

Detailed lens data corresponding to the configuration of the imaging lens illustrated in FIG. 2 are shown in Table 3 and Table 4 as Example 2, in the same manner as that for Example 1. Similarly, detailed lens data corresponding to the configurations of the imaging lenses illustrated in FIG. 3 through FIG. 10 are shown in Tables 5 through 20 as Example 3 through Example 10. In the imaging lenses of Example 1 and Examples 5 through 10, both of the surfaces of all of the first lens L1 through the sixth lens L6 are aspherical surfaces. In the imaging lenses of Examples 2 through 4, both of the surfaces of all of the second lens L2 through the sixth lens L6 are aspherical surfaces.

A through D of FIG. 12 are diagrams that illustrate aberrations of the imaging lens of Example 1, wherein the diagrams respectively illustrate spherical aberration, astigmatism, distortion, and lateral chromatic aberration (chromatic aberration of magnification) of the imaging lens of Example 1. Each of the diagrams that illustrate spherical aberration, astigmatism (field curvature) and distortion illustrate aberrations using the d line (wavelength: 587.56 nm) as a reference wavelength. The diagrams that illustrate spherical aberration and lateral chromatic aberration also show aberrations related to the F line (wavelength: 486.1 nm) and the C line (wavelength: 656.27 nm). In addition, the diagram that illustrates spherical aberration also shows aberration related to the g line (wavelength: 435.83 nm). In the diagram that illustrates astigmatism, aberration in the sagittal direction (S) is indicated by a solid line, while aberration in the tangential direction (T) is indicated by a broken line. In addition, "Fno." denotes an F number, and "ω" denotes a half angle of view.

Similarly, various aberrations of the imaging lens of Example 2 are illustrated in A through D of FIG. 13. Similarly, various aberrations of the imaging lenses of Example 3 through Example 10 are illustrated in A through D of FIG. 14 through A through D of FIG. 21.

Table 21 shows values corresponding to Conditional Formulae (1) through (11), respectively summarized for each of Examples 1 through 10. Note that R1, R2, R8 and R9 of FIGS. 1 through 10 and Tables 1, 3, 5, . . . , 19 (the odd numbered tables) respectively correspond to the paraxial radius of curvature R1f of the surface of the first lens toward the object side, the paraxial radius of curvature R1r of the surface of the first lens toward the image side, the paraxial radius of curvature R4f of the surface of the fourth lens toward the object side, and the paraxial radius of curvature R4r of the surface of the fourth lens toward the image side of Conditional Formulae (1) through (6), in Table 21.

As can be understood from each set of numerical value data and from the diagrams that illustrate aberrations, each of the Examples realize a shortening of the total length, a small F number, and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 2.84, BFL = 0.98

| Si | Ri | Di | Ndj | νdj |
|---|---|---|---|---|
| *1 | −1.9123 | 0.33 | 1.53800 | 53.00 |
| *2 | −2.6340 | 0.07 | | |
| 3 (aperture stop) | ∞ | 0.00 | | |
| *4 | 2.6796 | 0.99 | 1.53800 | 57.00 |
| *5 | −0.9854 | 0.07 | | |
| *6 | −1.6043 | 0.30 | 1.64000 | 23.00 |
| *7 | −25.4309 | 0.76 | | |
| *8 | −0.6345 | 0.41 | 1.53800 | 57.00 |
| *9 | −0.8314 | 0.07 | | |
| *10 | 3.8966 | 0.53 | 1.54200 | 57.00 |
| *11 | −3.9287 | 0.07 | | |
| *12 | 2.6357 | 0.48 | 1.54500 | 50.00 |
| *13 | 1.2063 | 0.40 | | |
| 14 | ∞ | 0.15 | 1.51633 | 64.14 |
| 15 | ∞ | 0.48 | | |

*aspherical surface

TABLE 2

Example 1: Aspherical Surface Data

| Surface Number | K | A3 | A4 | A5 | A6 |
|---|---|---|---|---|---|
| 1 | −1.0000099E+00 | 4.2458619E−03 | 3.0939340E−03 | −2.1743516E−03 | −2.1620601E−03 |
| 2 | −9.3358508E−01 | 1.8173685E−03 | −3.7611650E−03 | −5.7511800E−03 | −5.5183725E−03 |
| 4 | −2.3123896E+01 | −1.7223365E−02 | 2.3867652E−01 | −5.1447834E−01 | 4.3470228E−01 |
| 5 | 7.0906370E−01 | 1.9701991E−01 | −3.4887541E−02 | 1.1931196E−01 | −2.2884029E−01 |
| 6 | −5.5140178E+00 | 1.7449776E−01 | −1.9388124E−01 | 8.8352056E−02 | −3.2354296E−01 |
| 7 | −1.0000009E+01 | 3.5650912E−02 | −9.0820308E−02 | 4.3170527E−01 | −9.9462677E−01 |
| 8 | −4.0393694E−01 | −2.6782373E−01 | 1.1232442E+00 | −3.1314508E+00 | 5.0958013E+00 |
| 9 | −3.6514974E−01 | −2.4562135E−01 | 7.9636374E−01 | −1.7683559E+00 | 1.9872970E+00 |
| 10 | 9.6749465E−01 | 4.2477788E−02 | −4.4169845E−02 | −1.1925011E−02 | −1.1759784E−03 |
| 11 | 9.3187121E−01 | 9.7759449E−02 | −1.9514941E−03 | −6.4877646E−03 | −2.9405047E−03 |
| 12 | −2.6333204E+00 | 1.0845965E−01 | −5.1834509E−01 | 4.5391917E−01 | −1.3301464E−01 |
| 13 | −8.0773733E+00 | 1.3063842E−01 | −2.3826360E−01 | 1.1416505E−01 | 2.8561259E−02 |

TABLE 2-continued

Example 1: Aspherical Surface Data

|   | A7 | A8 | A9 | A10 |
|---|---|---|---|---|
| 1 | −2.7213836E−03 | −1.1604908E−02 | 5.3979559E−02 | −2.8691777E−02 |
| 2 | −5.3629794E−02 | 1.2852792E−01 | 2.6637212E−01 | −3.4139960E−01 |
| 4 | −1.1538124E−01 | −4.9358225E−01 | 5.9487253E−01 | −1.7161182E−01 |
| 5 | −1.0207921E−01 | 6.5010999E−02 | −1.0513329E−01 | 2.6613288E−01 |
| 6 | −1.4111891E−01 | 2.6200521E−01 | −2.3642185E−02 | 1.0477658E−01 |
| 7 | 8.6530878E−01 | −2.4673123E−01 | −2.8420891E−02 | 5.4043099E−03 |
| 8 | −4.2062989E+00 | 1.2417149E+00 | 4.5784187E−01 | −2.8913020E−01 |
| 9 | −9.7843686E−01 | −6.9728683E−02 | 2.7042541E−01 | −6.3331303E−02 |
| 10 | 6.2392929E−04 | 7.3035355E−04 | 1.9013662E−04 | −7.6449631E−04 |
| 11 | −1.1172075E−03 | −3.6802444E−04 | 3.8687975E−05 | 2.3754794E−04 |
| 12 | −3.8689078E−02 | 3.9544364E−02 | −1.0459747E−02 | 9.4291317E−04 |
| 13 | −5.6722112E−02 | 2.5703163E−02 | −5.1723068E−03 | 3.8788456E−04 |

TABLE 3

Example 2
f = 2.16, BFL = 0.85

| Si | Ri | Di | Ndj | vdj |
|---|---|---|---|---|
| 1 | −3.0325 | 1.03 | 1.53385 | 53.84 |
| 2 | −5.3465 | 0.07 | | |
| 3 (aperture stop) | ∞ | 0.00 | | |
| *4 | 2.3398 | 0.84 | 1.53385 | 53.84 |
| *5 | −0.8334 | 0.08 | | |
| *6 | −1.6442 | 0.26 | 1.63351 | 23.63 |
| *7 | 11.9546 | 0.59 | | |
| *8 | −0.4769 | 0.34 | 1.53385 | 53.84 |
| *9 | −0.6706 | 0.07 | | |
| *10 | 3.3301 | 0.46 | 1.53385 | 53.84 |
| *11 | −1.6631 | 0.07 | | |
| *12 | 2.5557 | 0.26 | 1.53385 | 53.84 |
| *13 | 1.0527 | 0.20 | | |
| 14 | ∞ | 0.14 | 1.51633 | 64.14 |
| 15 | ∞ | 0.55 | | |

*aspherical surface

TABLE 5

Example 3
f = 3.02, BFL = 1.03

| Si | Ri | Di | Ndj | vdj |
|---|---|---|---|---|
| 1 | −2.7166 | 0.67 | 1.53385 | 53.84 |
| 2 | −3.8349 | 0.07 | | |
| 3 (aperture stop) | ∞ | 0.00 | | |
| *4 | 2.6210 | 0.97 | 1.53385 | 53.84 |
| *5 | −1.1250 | 0.08 | | |
| *6 | −1.8767 | 0.30 | 1.62900 | 19.80 |
| *7 | 60.9157 | 0.80 | | |
| *8 | −0.6715 | 0.41 | 1.54800 | 53.84 |
| *9 | −0.8685 | 0.07 | | |
| *10 | 3.9769 | 0.77 | 1.55100 | 53.84 |
| *11 | −2.0730 | 0.07 | | |
| *12 | 19.5821 | 0.34 | 1.53385 | 53.84 |
| *13 | 1.3605 | 0.25 | | |
| 14 | ∞ | 0.15 | 1.51633 | 64.14 |
| 15 | ∞ | 0.69 | | |

*aspherical surface

TABLE 4

Example 2: Aspherical Surface Data

| Surface Number | K | A3 | A4 | A5 | A6 |
|---|---|---|---|---|---|
| 4 | −2.1254331E+01 | −8.2964250E−02 | 5.8012406E−01 | −1.3880219E+00 | 1.4175090E+00 |
| 5 | 4.9756536E−01 | 1.7562297E−01 | −9.4256775E−02 | 3.1305863E−01 | −7.6929597E−01 |
| 6 | −8.6056550E+00 | 1.6933839E−01 | −4.1371889E−01 | 2.0784410E−01 | −1.1041510E+00 |
| 7 | −6.8645514E+00 | 2.1285311E−02 | −2.1963719E−01 | 1.1300330E+00 | −3.3204324E+00 |
| 8 | −6.2750709E−02 | −2.0519749E−01 | 2.3675714E+00 | −8.1928179E+00 | 1.7025675E+01 |
| 9 | −3.5355724E−01 | −3.8190030E−01 | 1.6113810E+00 | −4.6519419E+00 | 6.6334960E+00 |
| 10 | −8.9535009E−01 | −3.7983565E−02 | −9.1944001E−02 | −1.9161514E−02 | −3.8145361E−03 |
| 11 | 1.0000000E+00 | 1.2603318E−01 | 1.2247164E−01 | −5.2411105E−03 | −5.1396127E−03 |
| 12 | 4.2058247E−01 | 9.4145710E−02 | −1.0872800E+00 | 1.2472911E+00 | −4.6499603E−01 |
| 13 | −1.0000024E+01 | 1.3637624E−01 | −4.7885629E−01 | 3.1642781E−01 | 1.0219628E−01 |

|   | A7 | A8 | A9 | A10 |
|---|---|---|---|---|
| 4 | −4.2403080E−01 | −2.4325307E+00 | 5.2591035E+00 | −5.9308076E+00 |
| 5 | −4.5087924E−01 | 2.8690380E−01 | −9.4503071E−01 | 3.5521844E+00 |
| 6 | −6.0082104E−01 | 1.5003401E+00 | 1.3353114E−01 | 1.4229815E+00 |
| 7 | 3.6811758E+00 | −1.3173951E+00 | −1.6884701E−01 | 7.8540546E−02 |
| 8 | −1.7870968E+01 | 6.7234244E+00 | 3.1579545E+00 | −2.6937231E+00 |
| 9 | −4.1607705E+00 | −3.7994339E−01 | 1.8563963E+00 | −5.6132405E−01 |
| 10 | 7.5039531E−04 | 8.9495816E−04 | −2.3194459E−03 | −7.2329123E−03 |
| 11 | −2.5014760E−03 | −7.1839187E−04 | 1.0925089E−03 | 2.2189818E−03 |
| 12 | −1.7534750E−01 | 2.2907130E−01 | −7.8055581E−02 | 8.9845915E−03 |
| 13 | −2.5838529E−01 | 1.4742108E−01 | −3.8895446E−02 | 4.3076485E−03 |

TABLE 6

Example 3: Aspherical Surface Data

| Surface Number | K | A3 | A4 | A5 | A6 |
|---|---|---|---|---|---|
| 4 | −1.9957556E+01 | −2.5920047E−02 | 2.9773687E−01 | −5.2221891E−01 | 4.0748379E−01 |
| 5 | 8.8084204E−01 | 1.4778214E−01 | −4.1053978E−02 | 1.1889350E−01 | −2.3017887E−01 |
| 6 | −8.8495222E+00 | 1.1450731E−01 | −2.0305869E−01 | 8.2761910E−02 | −3.3764154E−01 |
| 7 | 1.0000009E+01 | 1.6349517E−02 | −1.0608103E−01 | 4.3811531E−01 | −1.0207237E+00 |
| 8 | 8.9622601E−02 | −1.3242345E−01 | 1.1458300E+00 | −3.1230376E+00 | 5.0980481E+00 |
| 9 | −2.7280858E−01 | −2.1084972E−01 | 7.8566219E−01 | −1.7710866E+00 | 1.9872777E+00 |
| 10 | −9.9998383E−01 | −1.7691266E−02 | −4.9216300E−02 | −7.2062381E−03 | −1.9652959E−04 |
| 11 | 7.8296411E−01 | 4.8523491E−02 | 3.4897568E−03 | −3.4960944E−03 | −2.0125115E−03 |
| 12 | −3.7941761E+00 | 6.0588634E−02 | −5.1918587E−01 | 4.7604195E−01 | −1.3930436E−01 |
| 13 | −9.1748545E+00 | 9.1833095E−02 | −2.3649565E−01 | 1.2043924E−01 | 3.1305309E−02 |

| | A7 | A8 | A9 | A10 |
|---|---|---|---|---|
| 4 | −1.4469672E−01 | −4.2420742E−01 | 7.2663949E−01 | −4.1414775E−01 |
| 5 | −1.0311942E−01 | 6.6425172E−02 | −9.8045218E−02 | 3.0328775E−01 |
| 6 | −1.4615697E−01 | 2.8528572E−01 | 1.5189444E−02 | 1.4207717E−01 |
| 7 | 8.9224466E−01 | −2.5407548E−01 | −2.7481980E−02 | 2.4295101E−03 |
| 8 | −4.2054716E+00 | 1.2415609E+00 | 4.5559823E−01 | −3.0510390E−01 |
| 9 | −9.7855045E−01 | −7.0071450E−01 | 2.7013562E−01 | −6.3755146E−02 |
| 10 | 4.6079767E−04 | 4.1537979E−04 | −1.5381646E−04 | −6.8841506E−04 |
| 11 | −6.9125878E−04 | −1.2223763E−04 | 1.2660387E−04 | 2.3719937E−04 |
| 12 | −4.1251541E−02 | 4.2339494E−02 | −1.1335971E−02 | 1.0358088E−03 |
| 13 | −6.0457937E−02 | 2.7311969E−02 | −5.6731053E−03 | 4.5802899E−04 |

TABLE 7

Example 4
f = 2.11, BFL = 0.82

| Si | Ri | Di | Ndj | vdj |
|---|---|---|---|---|
| 1 | −3.0554 | 1.24 | 1.53385 | 53.84 |
| 2 | −4.5277 | 0.07 | | |
| 3 (aperture stop) | ∞ | 0.00 | | |
| *4 | 1.9864 | 0.75 | 1.53385 | 53.84 |
| *5 | −0.9893 | 0.07 | | |
| *6 | −2.2813 | 0.26 | 1.63351 | 23.63 |
| *7 | 5.2979 | 0.54 | | |
| *8 | −0.5389 | 0.42 | 1.53385 | 53.84 |
| *9 | −0.7695 | 0.07 | | |
| *10 | 3.7736 | 0.45 | 1.53385 | 53.84 |
| *11 | −1.4927 | 0.07 | | |
| *12 | 2.7467 | 0.26 | 1.53385 | 53.84 |
| *13 | 1.0183 | 0.44 | | |
| 14 | ∞ | 0.14 | 1.51633 | 64.14 |
| 15 | ∞ | 0.29 | | |

*aspherical surface

TABLE 8

Example 4: Aspherical Surface Data

| Surface Number | K | A3 | A4 | A5 | A6 |
|---|---|---|---|---|---|
| 4 | −2.4088037E+01 | −4.5004020E−02 | 6.0598121E−01 | −1.3500980E+00 | 1.4513285E+00 |
| 5 | 6.6625872E−01 | 1.3937687E−01 | −1.5976590E−01 | 2.9217488E−01 | −8.4693807E−01 |
| 6 | −6.4078922E+00 | 1.6542853E−01 | −3.4733935E−01 | 2.2127153E−01 | −1.0619809E+00 |
| 7 | 4.6073511E−01 | 6.2321388E−02 | −2.3048274E−01 | 1.1502913E+00 | −3.3033575E+00 |
| 8 | 1.5276436E−01 | −1.7276107E−01 | 2.3521278E+00 | −8.2088291E+00 | 1.6999239E+01 |
| 9 | −7.2160922E−01 | −4.1783501E−01 | 1.5473441E+00 | −4.6689916E+00 | 6.6279181E+00 |
| 10 | −1.0000000E+00 | −9.8857875E−02 | −4.1596538E−02 | −2.0895302E−02 | −5.0304167E−03 |
| 11 | 6.3326706E−01 | 1.1621445E−01 | 2.9140898E−02 | −6.2365182E−03 | −2.9629984E−03 |
| 12 | 4.6897546E−01 | 1.2020272E−01 | −1.0903338E+00 | 1.2451199E+00 | −4.6524554E−01 |
| 13 | −9.2945937E+00 | 1.6756340E−01 | −5.1213329E−01 | 3.1980335E−01 | 1.0391551E−01 |

TABLE 8-continued

Example 4: Aspherical Surface Data

|  | A7 | A8 | A9 | A10 |
|---|---|---|---|---|
| 4 | −7.3158146E−01 | −3.0900591E+00 | 8.2362362E+00 | −9.0238581E+00 |
| 5 | −4.9072634E−01 | 5.8086749E−01 | −1.3206638E+00 | 4.6313077E+00 |
| 6 | −5.1318314E−01 | 1.5771057E+00 | −1.8614257E−01 | 2.1618490E+00 |
| 7 | 3.6982830E+00 | −1.3015896E+00 | −1.5818808E−01 | 1.7511632E−01 |
| 8 | −1.7918282E+01 | 6.7452369E+00 | 3.1793950E+00 | −2.6594324E+00 |
| 9 | −4.1661269E+00 | −3.8733222E−01 | 1.8259319E+00 | −5.9416076E−01 |
| 10 | −1.7492526E−03 | −1.2115496E−03 | −1.5851897E−03 | −2.7652043E−03 |
| 11 | −9.3863951E−04 | 1.9417265E−04 | 5.8842055E−04 | 9.5559746E−04 |
| 12 | −1.7516765E−01 | 2.2918601E−01 | −7.8010402E−02 | 8.9912905E−03 |
| 13 | −2.5801455E−01 | 1.4748335E−01 | −3.8874991E−02 | 4.3306865E−03 |

TABLE 9

Example 5
f = 2.88, BFL = 0.95

| Si | Ri | Di | Ndj | νdj |
|---|---|---|---|---|
| *1 | −1.9096 | 0.40 | 1.53385 | 53.84 |
| *2 | −2.5401 | 0.07 | | |
| 3 (aperture stop) | ∞ | 0.00 | | |
| *4 | 2.3521 | 0.97 | 1.53385 | 53.84 |
| *5 | −1.0668 | 0.07 | | |
| *6 | −1.5305 | 0.30 | 1.63351 | 23.63 |
| *7 | −7.8489 | 0.68 | | |
| *8 | −0.6546 | 0.46 | 1.53385 | 53.84 |
| *9 | −0.8231 | 0.10 | | |
| *10 | 4.0677 | 0.43 | 1.53385 | 53.84 |
| *11 | 4.4364 | 0.09 | | |
| *12 | 1.3038 | 0.49 | 1.53385 | 53.84 |
| *13 | 1.1087 | 0.40 | | |
| 14 | ∞ | 0.15 | 1.51633 | 64.14 |
| 15 | ∞ | 0.45 | | |

*aspherical surface

TABLE 11

Example 6
f = 2.87, BFL = 0.99

| Si | Ri | Di | Ndj | νdj |
|---|---|---|---|---|
| *1 | −2.1978 | 0.33 | 1.53385 | 53.84 |
| *2 | −3.1547 | 0.11 | | |
| 3 (aperture stop) | ∞ | 0.00 | | |
| *4 | 2.7921 | 0.99 | 1.53385 | 53.84 |
| *5 | −0.9454 | 0.08 | | |
| *6 | −1.5700 | 0.30 | 1.63351 | 23.63 |
| *7 | −19.4407 | 0.69 | | |
| *8 | −0.6378 | 0.41 | 1.53385 | 53.84 |
| *9 | −1.0182 | 0.07 | | |
| *10 | 3.6516 | 0.43 | 1.53385 | 53.84 |
| *11 | −15.1938 | 0.09 | | |
| *12 | 1.5656 | 0.66 | 1.53385 | 53.84 |
| *13 | 1.4105 | 0.40 | | |
| 14 | ∞ | 0.15 | 1.51633 | 64.14 |
| 15 | ∞ | 0.50 | | |

*aspherical surface

TABLE 10

Example 5: Aspherical Surface Data

| Surface Number | K | A3 | A4 | A5 | A6 |
|---|---|---|---|---|---|
| 1 | −7.2414065E−01 | 5.3029831E−03 | 3.0171092E−03 | −5.0159940E−03 | −6.7785265E−03 |
| 2 | −1.0000009E+00 | 1.2807595E−03 | 1.7548288E−03 | 5.4307186E−03 | −7.9727244E−03 |
| 4 | −2.0911192E+01 | −4.0542422E−03 | 2.7059062E−01 | −5.1472592E−01 | 4.3287143E−01 |
| 5 | 8.6384192E−01 | 1.5255859E−01 | −1.6995392E−02 | 1.2025847E−01 | −2.2793456E−01 |
| 6 | −5.0690808E+00 | 1.6588178E−01 | −1.8333646E−01 | 8.9714970E−02 | −3.2396606E−01 |
| 7 | −9.9886759E+00 | 7.5695223E−02 | −8.3896701E−02 | 4.2748989E−01 | −9.9590634E−01 |
| 8 | −5.6872471E−01 | −2.6274957E−01 | 1.1145062E+00 | −3.1323307E+00 | 5.0960372E+00 |
| 9 | −2.3990487E−01 | −1.8656113E−01 | 7.9375996E−01 | −1.7674045E+00 | 1.9875314E+00 |
| 10 | 7.3494059E−01 | 1.0622230E−01 | −7.8923386E−02 | −1.7234094E−02 | −1.0128434E−03 |
| 11 | 8.3098237E−01 | 1.9967192E−02 | −2.6783706E−02 | −6.0221716E−03 | −2.6656139E−03 |
| 12 | −9.2745322E−01 | 2.0586163E−02 | −5.2595791E−01 | 4.7324917E−01 | −1.3942886E−01 |
| 13 | −6.8535211E+00 | 1.0782151E−01 | −2.4425677E−01 | 1.2055679E−01 | 3.0130206E−02 |

|  | A7 | A8 | A9 | A10 |
|---|---|---|---|---|
| 1 | 3.6573670E−03 | 6.6336341E−03 | 4.0106227E−02 | −3.1511012E−02 |
| 2 | −7.2095863E−02 | 7.8837308E−02 | 2.9707573E−01 | −2.6618004E−01 |
| 4 | −1.1448181E−01 | −4.8200555E−01 | 6.0505371E−01 | −2.0564397E−01 |
| 5 | −1.0085391E−01 | 6.6260916E−02 | −1.0443011E−01 | 2.6036557E−01 |
| 6 | −1.4163554E−01 | 2.6157833E−01 | −2.4276704E−02 | 1.0486104E−01 |
| 7 | 8.6468551E−01 | −2.4727759E−01 | −2.8671584E−02 | 5.8489717E−03 |
| 8 | −4.2060176E+00 | 1.2419926E+00 | 4.5804420E−01 | −2.8899158E−01 |
| 9 | −9.7823717E−01 | −6.9593943E−02 | 2.7053658E−01 | −6.3247400E−02 |
| 10 | 7.6320836E−04 | 7.2753813E−04 | 1.2236531E−04 | −8.5197587E−04 |
| 11 | −1.0041470E−03 | −3.3642088E−04 | 5.2870729E−05 | 2.4470647E−04 |
| 12 | −4.0941457E−02 | 4.2426512E−02 | −1.1319902E−02 | 1.0338980E−03 |
| 13 | −6.0162165E−02 | 2.7425259E−02 | −5.5880227E−03 | 4.2772065E−04 |

TABLE 12

Example 6: Aspherical Surface Data

| Surface Number | K | A3 | A4 | A5 | A6 |
|---|---|---|---|---|---|
| 1 | −6.5422394E−01 | 4.1878780E−03 | 3.0795604E−03 | −2.1210838E−03 | −2.0065687E−03 |
| 2 | −9.9999103E−01 | 1.9014420E−03 | −3.7325999E−03 | −5.9240945E−03 | −6.0820840E−03 |
| 4 | −2.3178071E+01 | −2.2030522E−02 | 2.3742123E−01 | −5.1449577E−01 | 4.3460160E−01 |
| 5 | 6.1615854E−01 | 1.9579600E−01 | −3.4691883E−02 | 1.1940124E−01 | −2.2883770E−01 |
| 6 | −5.5561305E+00 | 1.6009172E−01 | −1.9472849E−01 | 8.8301735E−02 | −3.2352834E−01 |
| 7 | −1.0000043E+01 | 3.5032035E−02 | −9.2419943E−02 | 4.3132188E−01 | −9.9468640E−01 |
| 8 | −5.2679461E−01 | −2.5823448E−01 | 1.1209691E+00 | −3.1315995E+00 | 5.0958125E+00 |
| 9 | −3.8009873E−01 | −2.7095483E−01 | 7.9888559E−01 | −1.7678664E+00 | 1.9873286E+00 |
| 10 | 9.0229319E−01 | 6.5153490E−02 | −5.2740580E−02 | −1.2613054E−02 | −1.1815205E−03 |
| 11 | 9.6951352E−01 | 7.4557647E−02 | −3.5421555E−03 | −6.8401189E−03 | −3.0351447E−03 |
| 12 | −2.2523553E+00 | 1.0017989E−01 | −5.3436981E−01 | 4.7260562E−01 | −1.3970800E−01 |
| 13 | −8.2142571E+00 | 1.4107604E−01 | −2.4696283E−01 | 1.1846423E−01 | 2.9981791E−02 |

| | A7 | A8 | A9 | A10 |
|---|---|---|---|---|
| 1 | −2.4319703E−03 | −1.1465344E−02 | 5.3078062E−02 | −2.8676558E−02 |
| 2 | −5.4265593E−02 | 1.2939429E−01 | 2.6579052E−01 | −3.3729435E−01 |
| 4 | −1.1553661E−01 | −4.9400522E−01 | 5.9947227E−01 | −1.7589460E−01 |
| 5 | −1.0207889E−01 | 6.5027237E−02 | −1.0508358E−01 | 2.6602797E−01 |
| 6 | −1.4110103E−01 | 2.6202308E−01 | −2.3630906E−02 | 1.0477994E−01 |
| 7 | 8.6529745E−01 | −2.4673668E−01 | −2.8423758E−02 | 5.4052003E−03 |
| 8 | −4.2062939E+00 | 1.2417172E+00 | 4.5784227E−01 | −2.8912667E−01 |
| 9 | −9.7843620E−01 | −6.9728809E−02 | 2.7042538E−01 | −6.3331159E−02 |
| 10 | 6.2734043E−04 | 7.3093448E−04 | 1.8992150E−04 | −7.6497789E−04 |
| 11 | −1.1341709E−03 | −3.7089672E−04 | 3.8087964E−05 | 2.3736216E−04 |
| 12 | −4.1051194E−02 | 4.2399746E−02 | −1.1326066E−02 | 1.0312424E−03 |
| 13 | −6.0210235E−02 | 2.7558842E−02 | −5.6004003E−03 | 4.2432141E−04 |

TABLE 13

Example 7
f = 2.88, BFL = 0.95

| Si | Ri | Di | Ndj | vdj |
|---|---|---|---|---|
| *1 | −1.8157 | 0.33 | 1.53385 | 53.84 |
| *2 | −2.4241 | 0.09 | | |
| 3 (aperture stop) | ∞ | 0.00 | | |
| *4 | 2.7203 | 0.99 | 1.53385 | 53.84 |
| *5 | −0.9693 | 0.08 | | |
| *6 | −1.5695 | 0.30 | 1.63351 | 23.63 |
| *7 | −27.7250 | 0.76 | | |
| *8 | −0.6472 | 0.41 | 1.53385 | 53.84 |
| *9 | −1.0462 | 0.07 | | |
| *10 | 3.3686 | 0.61 | 1.53385 | 53.84 |
| *11 | −13.8096 | 0.07 | | |
| *12 | 1.4192 | 0.58 | 1.53385 | 53.84 |
| *13 | 1.3209 | 0.40 | | |
| 14 | ∞ | 0.15 | 1.51633 | 64.14 |
| 15 | ∞ | 0.45 | | |

*aspherical surface

TABLE 14

Example 7: Aspherical Surface Data

| Surface Number | K | A3 | A4 | A5 | A6 |
|---|---|---|---|---|---|
| 1 | −9.1950145E−01 | 4.5148805E−03 | 3.0878642E−03 | −3.8539675E−03 | −4.9568548E−03 |
| 2 | −1.0000000E+00 | 1.7492954E−03 | −4.0879017E−03 | −3.7458501E−03 | 2.0858978E−03 |
| 4 | −2.3173160E+01 | −1.9222202E−02 | 2.3672031E−01 | −5.1351827E−01 | 4.3535406E−01 |
| 5 | 6.7752643E−01 | 1.9390519E−01 | −3.2853837E−02 | 1.1944524E−01 | −2.2853617E−01 |
| 6 | −5.7577507E+00 | 1.6864291E−01 | −1.9500827E−01 | 8.8500924E−02 | −3.2336383E−01 |
| 7 | 4.1143223E+00 | 4.6453957E−02 | −9.7048662E−02 | 4.3030946E−01 | −9.9505504E−01 |
| 8 | −2.3746056E−01 | −2.3829392E−01 | 1.1251697E+00 | −3.1311031E+00 | 5.0958420E+00 |
| 9 | −2.4027787E−01 | −2.8574129E−01 | 7.9745375E−01 | −1.7678354E+00 | 1.9873616E+00 |
| 10 | 8.3059271E−01 | 5.4270260E−02 | −5.2501879E−02 | −1.2852290E−02 | −1.1975521E−03 |
| 11 | 9.9999998E−01 | 8.0169198E−02 | −1.4008940E−02 | −7.1166398E−03 | −3.0805557E−03 |
| 12 | −1.5720318E+00 | 7.2175350E−02 | −5.3217742E−01 | 4.7280880E−01 | −1.3967309E−01 |
| 13 | −8.5729277E+00 | 1.3697700E−01 | −2.5348447E−01 | 1.1921225E−01 | 3.0095989E−02 |

TABLE 14-continued

Example 7: Aspherical Surface Data

|   | A7 | A8 | A9 | A10 |
|---|---|---|---|---|
| 1 | −2.6744018E−03 | 1.8384508E−05 | 6.5743136E−02 | −5.0531502E−02 |
| 2 | −3.8022634E−02 | 2.2907132E−02 | 3.7205184E−01 | −3.5536441E−01 |
| 4 | −1.1535211E−01 | −4.9764232E−01 | 5.9306138E−01 | −1.6448073E−01 |
| 5 | −1.0105417E−01 | 6.6418135E−02 | −1.0450928E−01 | 2.6343740E−01 |
| 6 | −1.4111126E−01 | 2.6177395E−01 | −2.4186981E−02 | 1.0378299E−01 |
| 7 | 8.6497288E−01 | −2.4703300E−01 | −2.8585175E−02 | 5.5172454E−03 |
| 8 | −4.2062336E+00 | 1.2418307E+00 | 4.5796597E−01 | −2.8903431E−01 |
| 9 | −9.7843175E−01 | −6.9747598E−02 | 2.7039512E−01 | −6.3359407E−02 |
| 10 | 6.4641466E−04 | 7.4060340E−04 | 1.8010520E−04 | −7.8353492E−04 |
| 11 | −1.1403931E−03 | −3.7836265E−04 | 3.9011448E−05 | 2.3738621E−04 |
| 12 | −4.1042229E−02 | 4.2402542E−02 | −1.1325079E−02 | 1.0315642E−03 |
| 13 | −6.0135151E−02 | 2.7567962E−02 | −5.6010657E−03 | 4.2304390E−04 |

TABLE 15

Example 8
f = 2.88, BFL = 0.96

| Si | Ri | Di | Ndj | νdj |
|---|---|---|---|---|
| *1 | −1.7949 | 0.37 | 1.53385 | 53.84 |
| *2 | −2.3757 | 0.07 | | |
| 3 (aperture stop) | ∞ | 0.00 | | |
| *4 | 2.9491 | 0.99 | 1.53385 | 53.84 |
| *5 | −0.9491 | 0.08 | | |
| *6 | −1.5233 | 0.30 | 1.63351 | 23.63 |
| *7 | −70.2251 | 0.83 | | |
| *8 | −0.7297 | 0.46 | 1.53385 | 53.84 |
| *9 | −0.9768 | 0.07 | | |
| *10 | 4.3233 | 0.50 | 1.53385 | 53.84 |
| *11 | 3.5045 | 0.07 | | |
| *12 | 1.0752 | 0.61 | 1.53385 | 53.84 |
| *13 | 1.3535 | 0.40 | | |
| 14 | ∞ | 0.15 | 1.51633 | 64.14 |
| 15 | ∞ | 0.47 | | |

*aspherical surface

TABLE 16

Example 8: Aspherical Surface Data

| Surface Number | K | A3 | A4 | A5 | A6 |
|---|---|---|---|---|---|
| 1 | −7.4819584E−01 | 4.5677963E−03 | 5.2987912E−03 | −3.7187538E−04 | 1.8376162E−03 |
| 2 | −3.9872107E−01 | 2.6372508E−03 | −2.4931391E−03 | 6.5322285E−03 | 1.6592532E−02 |
| 4 | −2.2716976E+01 | −2.7989875E−02 | 2.3149140E−01 | −5.1417942E−01 | 4.3466900E−01 |
| 5 | 6.4767839E−01 | 2.0318041E−01 | −2.9181380E−02 | 1.1850423E−01 | −2.2908833E−01 |
| 6 | −5.1007328E+00 | 1.6265245E−01 | −1.8830803E−01 | 8.9482095E−02 | −3.2192837E−01 |
| 7 | −8.2588102E+00 | 2.5501972E−02 | −9.1779694E−02 | 4.3345154E−01 | −9.9439338E−01 |
| 8 | −7.2568740E−02 | −2.2709486E−01 | 1.1139688E+00 | −3.1335697E+00 | 5.0958220E+00 |
| 9 | 2.1033738E−01 | −2.4030932E−01 | 7.9655074E−01 | −1.7657084E+00 | 1.9882854E+00 |
| 10 | 3.7309521E−01 | 9.5133168E−02 | −6.8424333E−02 | −1.9400291E−02 | −2.1842213E−03 |
| 11 | 7.4443579E−01 | 1.8715990E−02 | −3.2830275E−02 | −5.2820515E−03 | −3.4058711E−03 |
| 12 | −4.4339551E−01 | 3.2082013E−02 | −5.2862005E−01 | 4.7124758E−01 | −1.3986873E−01 |
| 13 | −7.3682322E+00 | 1.3617212E−01 | −2.5863312E−01 | 1.1924014E−01 | 3.0578214E−02 |

|   | A7 | A8 | A9 | A10 |
|---|---|---|---|---|
| 1 | 1.1427455E−03 | −2.6545576E−02 | 2.0851816E−02 | 1.0622765E−02 |
| 2 | −4.8912688E−02 | 1.0233375E−01 | −1.7829243E−01 | 1.8934874E−01 |
| 4 | −1.0611079E−01 | −5.3041109E−01 | 5.4304347E−01 | −1.0225457E−01 |
| 5 | −1.0010470E−01 | 7.0646755E−02 | −1.0091471E−01 | 2.5185360E−01 |
| 6 | −1.3868517E−01 | 2.6422129E−01 | −2.3317430E−02 | 9.6985768E−02 |
| 7 | 8.6460156E−01 | −2.4786602E−01 | −2.9041788E−02 | 6.5951084E−03 |
| 8 | −4.2054241E+00 | 1.2429345E+00 | 4.5887288E−01 | −2.8840731E−01 |
| 9 | −9.7800570E−01 | −6.9431572E−02 | 2.7057923E−01 | −6.3040835E−02 |
| 10 | 5.5357945E−04 | 7.6330734E−04 | 1.9714675E−04 | −7.9998275E−04 |
| 11 | −1.0919924E−03 | −3.5535189E−04 | 6.0525316E−05 | 2.4556044E−04 |
| 12 | −4.1082607E−02 | 4.2397918E−02 | −1.1320690E−02 | 1.0370170E−03 |
| 13 | −5.9958876E−02 | 2.7572970E−02 | −5.6096170E−03 | 4.1897646E−04 |

TABLE 17

Example 9
f = 3.17, BFL = 1.02

| Si | Ri | Di | Ndj | νdj |
|---|---|---|---|---|
| *1 | −2.0583 | 0.35 | 1.53385 | 53.84 |
| *2 | −2.8190 | 0.07 | | |
| 3 (aperture stop) | ∞ | 0.00 | | |
| *4 | 2.7993 | 0.98 | 1.53385 | 53.84 |
| *5 | −0.9675 | 0.07 | | |
| *6 | −1.5312 | 0.30 | 1.63351 | 23.63 |
| *7 | −14.4456 | 0.74 | | |
| *8 | −0.7042 | 0.45 | 1.53385 | 53.84 |
| *9 | −0.9116 | 0.11 | | |

TABLE 17-continued

Example 9
f = 3.17, BFL = 1.02

| Si | Ri | Di | Ndj | νdj |
|---|---|---|---|---|
| *10 | 3.4474 | 0.34 | 1.53385 | 53.84 |
| *11 | 3.0061 | 0.07 | | |
| *12 | 1.2334 | 0.58 | 1.53385 | 53.84 |
| *13 | 1.3836 | 0.40 | | |
| 14 | ∞ | 0.15 | 1.51633 | 64.14 |
| 15 | ∞ | 0.52 | | |

*aspherical surface

TABLE 18

Example 9: Aspherical Surface Data

| Surface Number | K | A3 | A4 | A5 | A6 |
|---|---|---|---|---|---|
| 1 | −8.6602120E−01 | 4.6114431E−03 | 5.1343160E−03 | −6.7591357E−04 | 1.8791208E−03 |
| 2 | −5.6321248E−01 | 2.4429208E−03 | −2.0150835E−03 | 8.0322797E−03 | 1.8547014E−02 |
| 4 | −2.2432753E+01 | −2.1383039E−02 | 2.3342813E−02 | −5.1430674E−01 | 4.3227041E−01 |
| 5 | 7.3398035E−01 | 1.9563347E−01 | −3.1140295E−02 | 1.1836785E−01 | −2.2926932E−01 |
| 6 | −5.2770769E+00 | 1.6074145E−01 | −1.8719823E−01 | 8.9477182E−02 | −3.2198270E−01 |
| 7 | −9.9999910E+00 | 4.2150076E−02 | −9.0434463E−02 | 4.3354796E−01 | −9.9433945E−01 |
| 8 | −9.1870925E−02 | −2.3240396E−01 | 1.1171289E+00 | −3.1327553E+00 | 5.0958299E+00 |
| 9 | 3.6126924E−02 | −2.4049849E−01 | 8.0098117E−01 | −1.7662680E+00 | 1.9881537E+00 |
| 10 | 3.9700159E−01 | 1.0234029E−01 | −6.1752101E−02 | −1.8155214E−02 | −2.1664933E−03 |
| 11 | 7.3917331E−01 | 3.8055296E−02 | −3.0548368E−02 | −6.1942724E−03 | −3.5434978E−03 |
| 12 | −6.2145626E−01 | 6.2214318E−02 | −5.2933462E−01 | 4.7154845E−01 | −1.3990114E−01 |
| 13 | −6.9648492E+00 | 1.5082044E−01 | −2.5852207E−01 | 1.1892934E−01 | 3.0584980E−02 |

| | A7 | A8 | A9 | A10 |
|---|---|---|---|---|
| 1 | 5.7765805E−04 | −2.6450593E−02 | 2.1375519E−02 | 1.4896471E−02 |
| 2 | −5.3084996E−02 | 6.7174470E−02 | −1.8342942E−01 | 2.7026069E−01 |
| 4 | −1.1369594E−01 | −5.2729587E−01 | 5.4874036E−01 | −9.5062141E−02 |
| 5 | −1.0039192E−01 | 7.0308356E−02 | −1.0221294E−01 | 2.5033478E−01 |
| 6 | −1.3878903E−01 | 2.6405868E−01 | −2.4367575E−02 | 9.7871760E−02 |
| 7 | 8.6468509E−01 | −2.4776389E−01 | −2.8862270E−02 | 6.7980109E−03 |
| 8 | −4.2055425E+00 | 1.2427560E+00 | 4.5894050E−01 | −2.8832966E−01 |
| 9 | −9.7801844E−01 | −6.9420177E−02 | 2.7064329E−01 | −6.3076741E−02 |
| 10 | 5.3146889E−04 | 7.5273685E−04 | 1.9135635E−04 | −8.0442813E−04 |
| 11 | −1.1145019E−03 | −3.6017640E−04 | 5.9389146E−05 | 2.4504799E−04 |
| 12 | −4.1103905E−02 | 4.2392753E−02 | −1.1321693E−02 | 1.0368967E−03 |
| 13 | −5.9950273E−02 | 2.7573651E−02 | −5.6101023E−03 | 4.1833574E−04 |

TABLE 19

Example 10
f = 2.87, BFL = 1.02

| Si | Ri | Di | Ndj | νdj |
|---|---|---|---|---|
| *1 | −2.3871 | 0.44 | 1.53385 | 53.84 |
| *2 | −3.0362 | 0.07 | | |
| 3 (aperture stop) | ∞ | 0.00 | | |
| *4 | 2.7860 | 1.02 | 1.53385 | 53.84 |
| *5 | −0.8961 | 0.08 | | |
| *6 | −1.2560 | 0.30 | 1.63351 | 23.63 |
| *7 | −10.3793 | 0.64 | | |
| *8 | −0.7268 | 0.41 | 1.63351 | 23.63 |
| *9 | −1.0129 | 0.07 | | |
| *10 | 5.5017 | 0.54 | 1.53385 | 53.84 |
| *11 | −2.5333 | 0.11 | | |
| *12 | 2.2907 | 0.50 | 1.53385 | 53.84 |
| *13 | 1.0921 | 0.40 | | |
| 14 | ∞ | 0.15 | 1.51633 | 64.14 |
| 15 | ∞ | 0.52 | | |

*aspherical surface

TABLE 20

Example 10: Aspherical Surface Data

| Surface Number | K | A3 | A4 | A5 | A6 |
|---|---|---|---|---|---|
| 1 | 3.2839935E−01 | 4.4865563E−03 | 7.4736534E−04 | −1.5678468E−03 | −3.2440985E−03 |
| 2 | −9.1114085E−01 | −7.9320497E−04 | 1.0491292E−04 | 2.5410732E−03 | 1.0095846E−03 |
| 4 | −2.2326606E+01 | −2.0630285E−02 | 2.5682304E−01 | −5.1582192E−01 | 4.2387273E−01 |
| 5 | 4.8404831E−01 | 2.0544964E−01 | −3.8867471E−02 | 1.2364476E−01 | −2.2689918E−01 |
| 6 | −3.0254314E+00 | 1.7603508E−01 | −2.2101556E−01 | 8.7057227E−02 | −3.2423992E−01 |
| 7 | −4.5814038E+00 | 1.2762986E−02 | −8.0020991E−02 | 4.3044321E−01 | −9.9508734E−01 |
| 8 | −6.6227952E−01 | −2.4669235E−01 | 1.0404499E+00 | −2.7758985E+00 | 4.3924467E+00 |
| 9 | −5.9354238E−01 | −1.9274487E−01 | 7.2300116E−01 | −1.5726895E+00 | 1.7123294E+00 |
| 10 | −2.6152803E−01 | 3.0264627E−02 | −4.6584249E−02 | −9.2634701E−03 | −1.0249374E−03 |
| 11 | 5.2557577E−01 | 4.3931858E−02 | 3.0643761E−02 | −2.3459540E−03 | −2.4619336E−03 |
| 12 | −2.3204004E+00 | 8.4484051E−02 | −5.3337725E−01 | 4.7501379E−01 | −1.3915288E−01 |
| 13 | −6.9619741E+00 | 1.1934148E−01 | −2.3855001E−01 | 1.1871491E−01 | 2.9556049E−02 |

| Surface Number | A7 | A8 | A9 | A10 |
|---|---|---|---|---|
| 1 | −4.7004010E−03 | 2.1420618E−03 | 1.8230422E−02 | −6.2881800E−03 |
| 2 | −9.4824141E−02 | 3.2206656E−02 | 1.9815614E−01 | −6.5219203E−02 |
| 4 | −1.3763327E−01 | −4.8201815E−01 | 6.5081204E−01 | −2.2712540E−01 |
| 5 | −1.0433465E−01 | 5.6211944E−02 | −1.1714831E−01 | 2.6684435E−01 |
| 6 | −1.4269656E−01 | 2.6038497E−01 | −2.2525010E−01 | 1.1325090E−01 |
| 7 | 8.6612817E−01 | −2.4470301E−01 | −2.6374438E−02 | 5.7502349E−03 |
| 8 | −3.5183149E+00 | 1.0082630E+00 | 3.6071114E−01 | −2.2118667E−01 |
| 9 | −8.1848276E−01 | −5.6658229E−02 | 2.1309985E−01 | −4.8503688E−02 |
| 10 | 5.1312643E−04 | 4.6359575E−04 | −4.9657011E−05 | −8.5961448E−04 |
| 11 | −1.1085884E−03 | −4.0290543E−04 | 7.8678406E−06 | 2.1633805E−04 |
| 12 | −4.1007469E−02 | 4.2384546E−02 | −1.1343275E−02 | 1.0173625E−03 |
| 13 | −6.0274196E−02 | 2.7571160E−02 | −5.6029164E−03 | 4.2791525E−04 |

TABLE 21

Values Related to Conditional Formulae

| Formula | Condition | Example 1 | Example 2 | Example 3 | Example 4 | Example 5 | Example 6 |
|---|---|---|---|---|---|---|---|
| 1 | (R1f − R1r)/(R1f + R1r) | −0.16 | −0.28 | −0.17 | −0.19 | −0.14 | −0.18 |
| 2 | f/f2 | 1.92 | 1.70 | 1.87 | 1.56 | 1.88 | 1.97 |
| 3 | f3/f1 | 0.17 | 0.15 | 0.13 | 0.10 | 0.17 | 0.18 |
| 4 | f3/f4 | 0.15 | 0.28 | 0.14 | 0.27 | 0.03 | 0.53 |
| 5 | f/R6r | 2.35 | 2.05 | 2.22 | 2.07 | 2.59 | 2.04 |
| 6 | (R4f − R4r)/(R4f + R4r) | −0.13 | −0.17 | −0.13 | −0.18 | −0.11 | −0.23 |
| 7 | vd1 | 53.00 | 53.84 | 53.84 | 53.84 | 53.84 | 53.84 |
| 8 | TTL/f | 1.78 | 2.28 | 1.85 | 2.38 | 1.74 | 1.79 |
| 9 | TTL | 5.06 | 4.92 | 5.58 | 5.02 | 5.01 | 5.15 |
| 10 | BFL/f | 0.34 | 0.39 | 0.34 | 0.39 | 0.33 | 0.35 |
| 11 | BFL | 0.98 | 0.85 | 1.03 | 0.82 | 0.95 | 0.99 |

| Formula | Condition | Example 7 | Example 8 | Example 9 | Example 10 |
|---|---|---|---|---|---|
| 1 | (R1f − R1r)/(R1f + R1r) | −0.14 | −0.14 | −0.16 | −0.12 |
| 2 | f/f2 | 1.95 | 1.95 | 2.14 | 2.04 |
| 3 | f3/f1 | 0.16 | 0.14 | 0.16 | 0.08 |
| 4 | f3/f4 | 0.53 | 0.16 | 0.12 | 0.25 |
| 5 | f/R6r | 2.18 | 2.12 | 2.08 | 2.63 |
| 6 | (R4f − R4r)/(R4f + R4r) | −0.24 | −0.14 | −0.13 | −0.16 |
| 7 | vd1 | 53.84 | 53.84 | 53.84 | 53.84 |
| 8 | TTL/f | 1.82 | 1.85 | 1.60 | 1.81 |
| 9 | TTL | 5.24 | 5.31 | 5.08 | 5.20 |
| 10 | BFL/f | 0.33 | 0.34 | 0.32 | 0.35 |
| 11 | BFL | 0.95 | 0.96 | 1.02 | 1.02 |

What is claimed is:

1. An imaging lens consisting essentially of six lenses, including:
a first lens having a negative refractive power and a concave surface toward the object side;
a second lens having a positive refractive power;
a third lens having a negative refractive power;
a fourth lens having a negative refractive power and is of a meniscus shape with a concave surface toward the object side;
a fifth lens; and
a sixth lens having a concave surface toward the image side, the surface toward the image side thereof being an aspherical shape having at least one inflection point thereon, provided in this order from the object side; and
an aperture stop positioned at the object side of the surface of the third lens toward the object side.

2. The imaging lens as defined in claim 1, wherein:
the first lens is of a meniscus shape having a concave surface toward the object side.

3. The imaging lens as defined in claim 1 that further satisfies the conditional formula below:

$$-1 < (R1f - R1r)/(R1f + R1r) < 0 \tag{1}$$

wherein R1f is the paraxial radius of curvature of the surface of the first lens toward the object side and R1r is the paraxial radius of curvature of the surface of the first lens toward the image side.

4. The imaging lens as defined in claim 1 that further satisfies the conditional formula below:

$$1 < f/f2 < 3 \tag{2}$$

wherein f is the focal length of the entire system and f2 is the focal length of the second lens.

5. The imaging lens as defined in claim 1 that further satisfies the conditional formula below:

$$0 < f3/f1 < 0.5 \tag{3}$$

wherein f3 is the focal length of the third lens, and f1 is the focal length of the first lens.

6. The imaging lens as defined in claim 1 that further satisfies the conditional formula below:

$$0 < f3/f4 < 1.2 \tag{4}$$

wherein f3 is the focal length of the third lens and f4 is the focal length of the fourth lens.

7. The imaging lens as defined in claim 1 that further satisfies the conditional formula below:

$$1 < f/R6r < 4 \tag{5}$$

wherein f is the focal length of the entire system and R6r is the paraxial radius of curvature of the surface of the sixth lens toward the image side.

8. The imaging lens as defined in claim 1 that further satisfies the conditional formula below:

$$-0.5 < (R4f - R4r)/(R4f + R4r) < 0 \tag{6}$$

wherein R4f is the paraxial radius of curvature of the surface of the fourth lens toward the object side and R4r is the paraxial radius of curvature of the surface of the fourth lens toward the image side.

9. The imaging lens as defined in claim 1 that further satisfies the conditional formula below:

$$40 < vd1 \tag{7}$$

wherein vd1 is the Abbe's number of the first lens with respect to the d line.

10. The imaging lens as defined in claim 1 that further satisfies the conditional formula below:

$$1.0 < TTL/f < 3.0 \tag{8}$$

wherein TTL is the distance from the surface of the first lens toward the object side to the imaging surface along the optical axis (the portion of the distance corresponding to the back focus is an air converted length) and f is the focal length of the entire system.

11. The imaging lens as defined in claim 1 that further satisfies the conditional formula below:

$$4.0 < TTL < 6.0 \tag{9}$$

wherein TTL (mm) is the distance from the surface of the first lens toward the object side to the imaging surface along the optical axis (the portion of the distance corresponding to the back focus is an air converted length).

12. The imaging lens as defined in claim 1 that further satisfies the conditional formula below:

$$0.28 < BFL/f < 0.42 \tag{10}$$

wherein BFL is the distance from the apex of the surface of the sixth lens toward the image side to the imaging surface (an air converted length), and f is the focal length of the entire system.

13. The imaging lens as defined in claim 1 that further satisfies the conditional formula below:

$$0.75 < BFL < 1.2 \tag{11}$$

wherein BFL (mm) is the distance from the apex of the surface of the sixth lens toward the image side to the imaging surface (an air converted length).

14. The imaging lens as defined in claim 1 that further satisfies the conditional formula below:

$$-0.5 < (R1f - R1r)/(R1f + R1r) < -0.05 \tag{1-1}$$

wherein R1f is the paraxial radius of curvature of the surface of the first lens toward the object side and R1r is the paraxial radius of curvature of the surface of the first lens toward the image side.

15. The imaging lens as defined in claim 1 that further satisfies the conditional formula below:

$$1.3 < f/f2 < 2.5 \tag{2-1}$$

wherein f is the focal length of the entire system and f2 is the focal length of the second lens.

16. The imaging lens as defined in claim 1 that further satisfies the conditional formula below:

$$0 < f3/f1 < 0.3 \tag{3-1}$$

wherein f3 is the focal length of the third lens and f1 is the focal length of the first lens.

17. The imaging lens as defined in claim 1 that further satisfies the conditional formula below:

$$0 < f3/f4 < 0.8 \tag{4-1}$$

wherein f3 is the focal length of the third lens and f4 is the focal length of the fourth lens.

18. An imaging apparatus equipped with the lens defined in claim 1.

19. An imaging lens consisting essentially of six lenses, including:
a first lens having a negative refractive power and a concave surface toward the object side;
a second lens having a positive refractive power;
a third lens having a negative refractive power;
a fourth lens having a negative refractive power and is of a meniscus shape with a concave surface toward the object side;
a fifth lens; and
a sixth lens having a concave surface toward the image side, the surface toward the image side thereof being an aspherical shape having at least one inflection point thereon, provided in this order from the object side; and
an aperture stop is positioned at the object side of the surface of the second lens toward the object side.

* * * * *